US006353433B1

(12) United States Patent
Schumer

(10) Patent No.: US 6,353,433 B1
(45) Date of Patent: *Mar. 5, 2002

(54) DIGITIZER INTERFACE

(76) Inventor: Alfred L. Schumer, 20522 NE. 66th St., Redmond, WA (US) 98053

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/098,034

(22) Filed: Jun. 15, 1998

Related U.S. Application Data

(60) Continuation of application No. 08/634,065, filed on Apr. 18, 1996, now Pat. No. 5,768,492, which is a division of application No. 07/716,305, filed on Jun. 17, 1991, now abandoned.

(51) Int. Cl.[7] .................................................. G09G 5/00
(52) U.S. Cl. ....................................................... 345/173
(58) Field of Search ................................. 345/173, 174, 345/178, 179, 175, 176, 177, 156; 178/18.01, 18.03–18.09, 19.01, 20.01

(56) References Cited

U.S. PATENT DOCUMENTS

| | | | | |
|---|---|---|---|---|
| 4,058,849 A | * | 11/1977 | Fitzgerald et al. | |
| 4,451,895 A | * | 5/1984 | Sliwkowski | 345/156 |
| 4,578,768 A | * | 3/1986 | Racine | 178/18 |
| 4,677,258 A | * | 6/1987 | Kawashima et al. | 178/18 |
| 4,716,542 A | | 12/1987 | Peltz et al. | 15/64 |
| 4,763,356 A | * | 8/1988 | Day, Jr. et al. | 345/173 |
| 4,821,029 A | * | 4/1989 | Logan et al. | 345/173 |
| 4,827,410 A | * | 5/1989 | Corren | 345/179 |
| 4,855,725 A | * | 8/1989 | Fernandez | 345/185 |
| 4,933,514 A | * | 6/1990 | Bowers | 178/18 |
| 5,031,119 A | * | 7/1991 | Dulaney et al. | 345/173 |
| 5,049,862 A | * | 9/1991 | Dao et al. | 345/179 |
| 5,768,492 A | * | 6/1998 | Schumer | 345/173 |

OTHER PUBLICATIONS

Brown, Edward; A Windowing Mechanism for Structuring Input; Oct. 3, 1985; Manuscript Thesis University of Toronto Library Department of Computer Science.

(List continued on next page.)

Primary Examiner—Regina Liang
(74) Attorney, Agent, or Firm—Graybeal Jackson Haley LLP

(57) ABSTRACT

A digitizer interface that translates the digitizer-specific reports into virtual areas of the digitizer which may be divided into specific regions or virtual tablets. Each region permits the specification of individual coordinate systems or stored sequences of commands. The interface may be implemented on a host computer, in the digitizer, or in intermediate electronics. The interface allows reports from digitizers of differing data output formats to be translated into a standard format internal to the interface thereby isolating the host processor from a given digitizer's attributes. The interface may be configured to operate many digitizers from a single host.

64 Claims, 13 Drawing Sheets

OTHER PUBLICATIONS

Stevenson, David; (1990) "Absolute Pointing Device Memory Structure" Macintosh Technical Notes #266.

Sample 'ADBS' Resource; (1989) Apple Macintosh Developer Technical Support; Apple Computer Inc.

WIZ User's Guide PC Edition.

Johnson, Timothy E.; (1990) "Closer to that pen–and–paper feel" MacWeek.

Saarela, Janne; (1995) ANSI GKS Standard LCS04539–LCS04561.

Seiko Instruments USA Graphic Devices and Systems Division; (1990) Digitizing Tablet Software User's Guide [LCS01583–LCS01617].

ADI Program Autodesk, Inc. (1996) Autodesk Device Interface/ADI Driver Development Kit Version 2.1.

Summagraphics Corporation (1990) Tablet.com Programming Reference; Publication 84–0850–202.

IS Pensmith Drivers for DOS & Windows (1990) Kurta Corporation.

Brown, E. et al.; (1985) "Windows on Tablets as a Means of Achieving Virtual Input Devices" Computer Systems Research Institute LCS05114–LCS05119.

Buxton, William, et al.; (1986) "A Study in Two Handed Input" Computer Systems Research Institute [LCS05108–05113], pp. 1–10.

Device Driver Adaptation Guide; (1990) Microsoft Windows Device Development Kit Version 3.0 for the MS–DOS or PC–DOS Operating System.

IBM Operating System/2 Programming Tools and Information Version 1.2 (1989) [LCS07419–07479].

Shaw, Richard Hale; (1989) Exploring the Key Functions of the OS/2 Keyboard and Mouse Subsystems Microsoft Systems Journal.

Gilol, Wolfgang K.; (1978) "Interactive Computer Graphics—Data Structures, Algorithms, Languages" Technical University of Berlin and University of Minnesota [LCS04976–05011].

User manual Hitachi Software Utilities Version 1.01; (1988) Hitachi America, Ltd.

The Microsoft Universal Pointing Device interface, Application Note, Revision 1.1 (1985) Microsoft Corporation.

Microsoft Mouse Driver Software Interface manual [LCS07104–07124].

Tablet Extensions to the Mouse Driver Standard (1989) LCS/Telegraphics [LCS06491–06506].

XMOUSE Programming Reference (1988) LCS/Telegraphics [LCS06338–06405].

MM 1201 and MM 961 Data Tablets Technical Reference(1984) Summagraphics Corporation LCS01352–01431.

SummaSketch Drivers/Utilities User's Guide(1988) Summagraphics Corporation.

SummaSketch User's Guide (1985) \Summagraphics Corporation.

MM II 1812 Graphics Tablet Technical Reference (1990) Summagraphics Corporation.

The Autodesk Device Interface/ADI [LCS08315–08430].

ADI Driver Technical Reference LCS/Telegraphics [LCS06484–08235].

* cited by examiner

DIGITIZER INTERFACE

This is a continuation of the prior application Ser. No. 08/634,065, filed Apr. 18, 1996 now U.S. Pat. No. 5,768,492, which is a divisional of prior application Ser. No. 07/716,305, filed Jun. 17, 1991 now abandoned.

BACKGROUND OF THE INVENTION

1. Field of the Invention

This invention relates in general to digitizing or data tablets ("digitizers") and in particular to interfacing digitizers to host computers, their operating systems and application programs.

2. Background Art

Digitizers are computer peripherals that translate a user's hand motion into digital coordinates suitable for use by a computer system. This translation is performed within an X, Y and possibly Z coordinate system within the device comprising an electronic grid over which is placed a transducer. This transducer may be pen-shaped ("stylus"), rectangular or elliptical ("cursor" or "puck") containing one or more buttons. A microprocessor within the digitizer translates the position of the transducer on the grid into digital coordinates and reports its location and button status to the host computer via a communications link which is typically a stream of serial bits.

Information transmitted to the host computer is encapsulated in a specific format comprising multiple characters of data which are grouped into the button information and coordinates. Each transmission of this information is referred to as a "report." Reports are sent either continuously or upon satisfaction of some defined combination of button states or distance moved. The rate at which reports are sent from the digitizer to the host computer varies considerably depending upon the particular digitizer, the specification of the button states or programmed configuration and may range up to several hundred times per second.

In addition to transmitting coordinate data to the host computer, digitizers often accept commands from the host computer governing the operating characteristics of the digitizer. These commands are usually encoded in individual characters which collectively comprise a command and its arguments. Examples of such commands include scaling the digitizers axis to an absolute value or resolution in counts per unit of measurement, selecting the rate at which reports are transmitted or specifying the type or format of information sent with each report.

Upon receipt of each character of data from the digitizer, the host system is interrupted from the task it was engaged in and processes the data by combining it with previous data characters until a complete report has been received. It then translates this data and takes appropriate action depending on the information contained in the report, e.g. button presses or releases or coordinate values. Such actions may include moving a visible cursor on the video display attached to the host computer or selecting some action depending on the location and status of one or more buttons.

Digitizers are frequently used to draw information into an application program or select some application command via a button press or release. The determination of which action to perform is decided within the host computer by translating the button state and location of the cursor into known areas of the video display or digitizing tablet. If the action is based on translation of the action to a location within the video display, it is often referred to as a "menu selection." Alternatively, if the translation is performed based on a location within the digitizer, it is referred to as a "template command." This latter method often requires a "template" or physical menu positioned over the digitizer and depicting specific locations as menus or graphical images.

Regardless of the method used for translating the action, considerable computing time by the host processor is required which is often directly related to the number of locations within the video display or digitizer which must be tested and translated. This computing time reduces the amount of computing available to the host operating system or its application programs. Furthermore, in the event the translation is based upon locations within the digitizer, information pertaining to the specific digitizer such as its physical size and configuration must be used in the translation which often constrains the translation to a specific digitizer and requires a different methodology for each digitizer size and type.

Heretofore, efforts to provide template translations have been restricted to a small number of template areas and implemented as a series of computer instructions specific to the digitizer and the actual location of each menu location on the digitizer surface. These instructions may be executed by the microprocessor within the digitizer or by the host processor through the use of a dedicated translation application program. When done this way, these methods are referred to as "hard-coded" templates and are determined at the time of digitizer manufacture or creation of the application program or template. Once created, these instructions are dependent upon the known digitizer attributes and the locations to be translated. Hence, they cannot be changed without redesigning the digitizer or recreating the application program on the host processor.

Hard-coded templates necessarily restrict template translation activities to the time of digitizer manufacture or creation of the application program by experienced computer professionals and do not afford the typical computer user the ability to modify or even create their own templates. Furthermore, such templates are restricted to the specific digitizer, are often expensive to develop or purchase and require considerable host processor computing time resulting in lower system throughput manifested by slower application response time.

SUMMARY OF THE INVENTION

The principal object of the present invention is to provide a method of defining, manipulating and processing large numbers of template locations on a digitizer in a manner which significantly reduces host processor computation. The templates may be created and changed dynamically by computer users and application programs and the application programs are not restricted to any specific digitizer or host processor.

In fulfillment and implementation of the previously recited object, a primary feature of the invention resides in the definition and methodology of an advanced digitizer interface (the "Interface") which allows the dynamic creation and manipulation of template areas non-specific to any digitizer or host processor. Embedded in this Interface is a defined methodology for translating digitizer-specific reports into virtual areas of the digitizer which are accessed as specific numbered regions. Each of these regions may possess various attributes which collectively permit the specification of individual coordinate systems or stored sequences of commands.

An additional feature of the invention includes a device-independent Interface to the digitizer which isolates the computer user or application program from a given digitizer's attributes and permits creation of one set of instructions which may be executed across any number of digitizers or host processor systems. The invention includes a tablet addressing feature which allows many tablets to be connected to a single computer or a network of computers and operated independently of each other.

Finally, the preferred embodiment of the invention utilizes a dedicated microprocessor to implement this advanced digitizer Interface which significantly improves host processor throughput and application response time (the "Circuit"). This microprocessor may be implemented as either an input-output processor for the host system, dedicated external controller or a replacement to the digitizer microprocessor itself; the choice of which is governed by cost and performance considerations.

DESCRIPTION OF THE INVENTION

The description of the invention encompasses four sections including: a description of the Interface, the preferred embodiment implemented as discrete microprocessor circuit, the firmware instructions to the preferred embodiment and finally an example of using the Interface within an application context. The Interface details the conceptual methodology and specific command structure while the circuit description discloses one possible implementation for an IBM PC/AT personal computer. The firmware description includes block flowcharts of computer instructions for combining the Interface and microprocessor circuit and the application example demonstrates their use in creating a template menuing system.

Interface Description
Configuration

Figure 1:
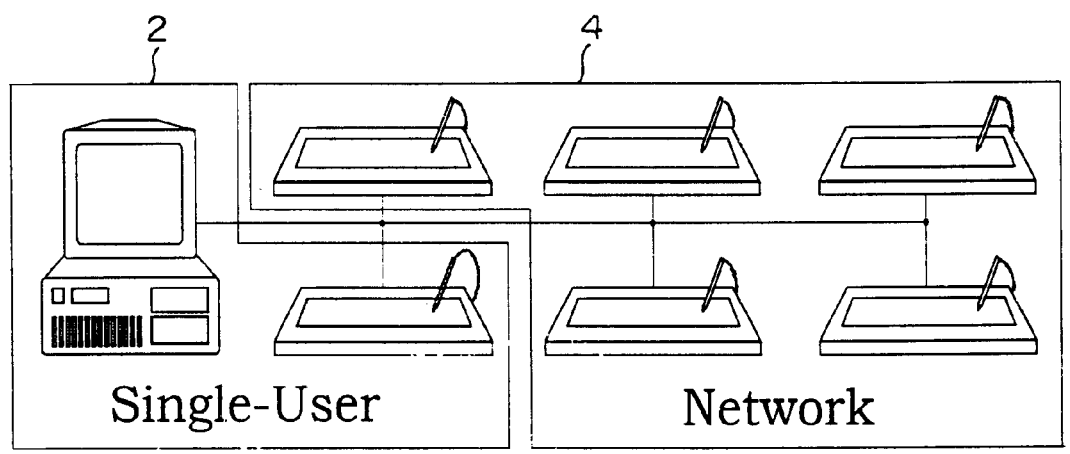
FIG. 1 illustrates the single-user and network configurations embodied in the present invention.

Referring to FIG. 1, the Interface supports two configurations: single-user 2 and network 4. The single-user 2 configuration supports one digitizer per system while the network configuration 4 supports up to sixteen digitizers inter-connected to a single host system. An important feature of the Interface is the ability to execute Interface commands without modification across either configuration through the use of tablet addresses (see Packet Protocol below).

The single-user configuration 2 of the Interface may be implemented as a discrete microprocessor circuit as described below (see "Circuit") or within the microprocessor of the digitizer connected directly to a host processor via an EIA-232 serial communications link.

The network configuration 4 of the Interface may be implemented across a number of well-known, industry-standard network topologies and architectures. However, the preferred embodiment utilizes the nine-bit serial communications mode inherent in the microprocessor of the circuit (as described below) utilizing the topology and architecture of the BITBUS Interconnect Serial Control Bus across an EIA-485 serial communications link. This serial bus standard is well-known and fully described in "The BITBUS Interconnect Serial Control Bus Specification" (Intel Corporation, 1988). The EIA-485 serial communications standard is fully described in "Standard for Electrical Characteristics of Generators and Receivers for Use in Balanced Digital Multipoint Systems" (Electronics Industry Association, 1983).

Logical Layers

Figure 2:
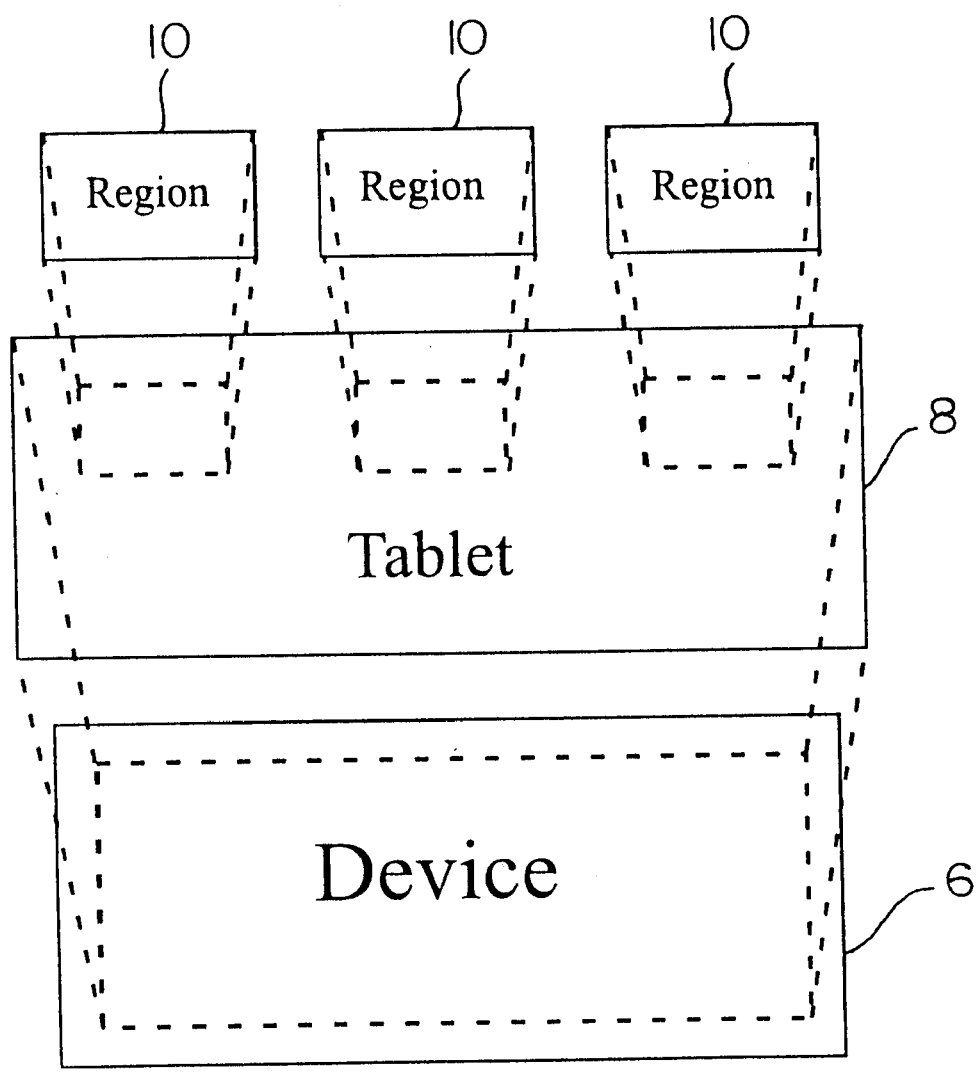
FIG. 2 illustrates the relationships among the conceptual digitizer layers embodied in the present invention.

Referring to FIG. 2, the Interface supports three logical layers which provide an increasing level of abstraction from the actual digitizer: device 6, tablet 8 and region 10.

The device layer 6 represents the physical device or digitizer whose properties are established at the time of manufacture. Since digitizers vary greatly both in terms of physical characteristics and output formats, the device layer provides the first level of abstraction by translating both the formats and physical characteristics into a device-independent format internal to the Interface. The device layer may be queried for certain attributes but cannot be changed.

The tablet layer 8 provides the first true level of abstraction to an application program and is consistent across all devices. It is the logical level at which device-independent control over the Interface is exercised and incorporates a device-independent coordinate system which may be scaled by an application program and within which regions are created.

The region layer 10 provides the highest level of abstraction to the application program and from which all user-events are generated. The region layer consists of discrete areas defined within the tablet layer which may be assigned specific attributes such as event masks, definable coordinate systems or stored sequences of Interface commands executed upon some user-event.

Coordinate Systems

Figure 3:
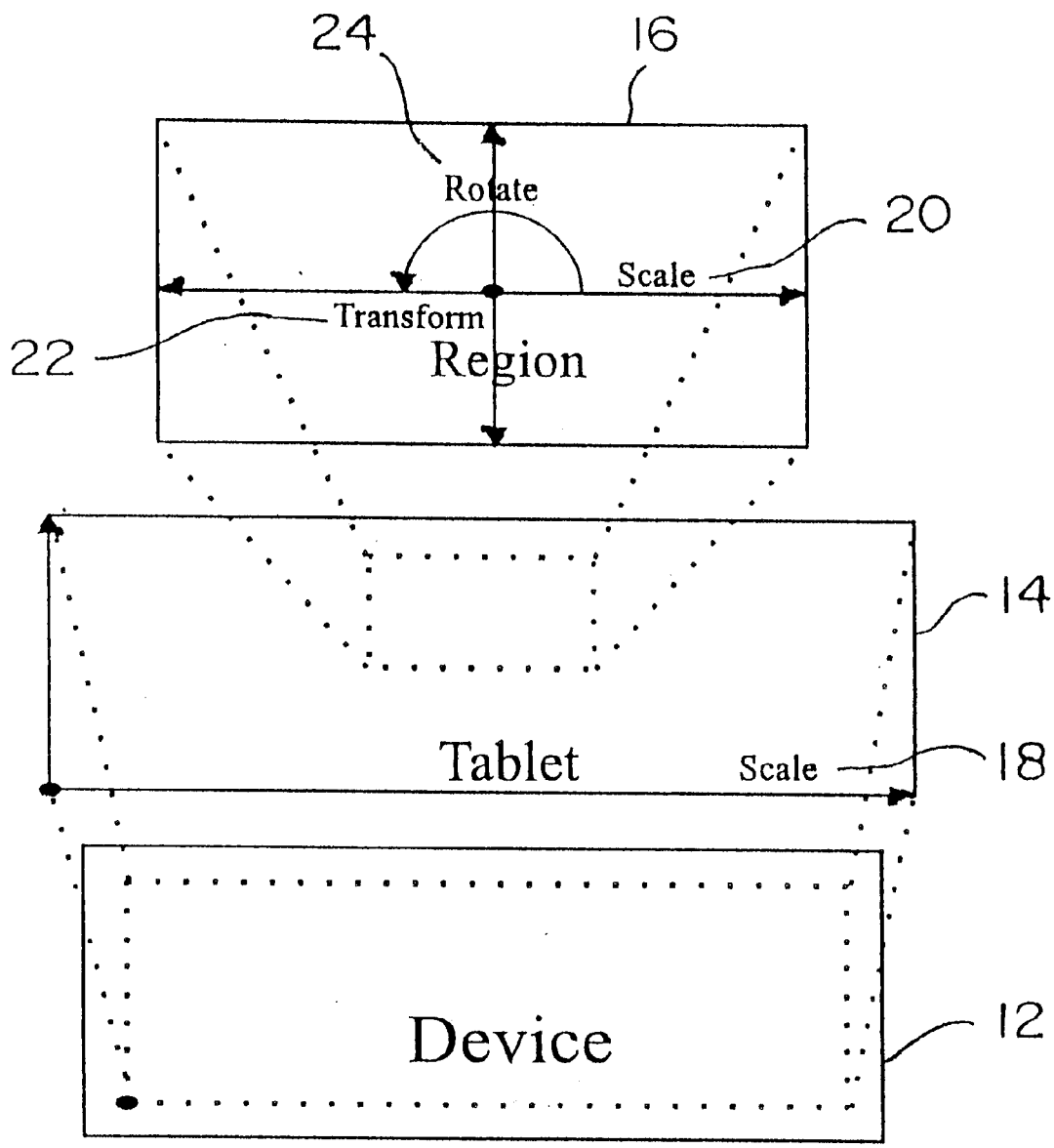
FIG. 3. illustrates the relationships among the three coordinate systems embodied in the present invention.

A "coordinate system" is used to identify a point relative to a horizontal, vertical and occasional Z-axis. All coordinate systems have an origin and may be transformed, scaled or rotated. Each point on a tablet can be located by means of a unique pair of X and Y coordinates. Referring to FIG. 3, the Interface supports three such coordinate systems: device 12, tablet 14 and regional 16.

The device coordinate system 12 is dependent upon the physical properties of each digitizer and cannot be changed by an application program. However, properties of the device coordinate system can be queried including the device axis, extents and resolution.

The tablet coordinate system 14 is super-imposed on all devices that the Interface supports and is used to define regional coordinate systems and upon which all tablet geometries are calculated. The tablet coordinate system extents may be scaled 18 either by explicitly setting the extents or implicitly by setting the resolution in lines per inch. The tablet coordinate system may not be tansformed or rotated and cannot be changed once one or more regions have been defined.

Regional coordinate systems 16 (also referred to as local coordinate systems) are the most powerful and versatile coordinate systems supported by the Interface and may be scaled 20, transformed 22 or rotated 24. Prior to use, they must be explicitly created by specifying the bounding rectangle in tablet coordinates and may be destroyed explicitly by closing each region or implicitly when closing the tablet.

Once created, a regional coordinate system may be scaled by changing the extents or resolution, transformed by moving the origin or rotated by specifying a counter-clockwise rotation factor in degrees. Each of these properties may also be queried, generating response packets whose format is dependent on the information requested.

Packet Protocol

All communication between the Interface and host processor is accomplished via packets which comprise two or more 16-bit words. Each packet is delineated and synchronized through the use of a phasing bit in the most-significant-bit of each word. This phase bit is a logical-one at the start of each packet and zero for each successive packet word. This allows both the Interface and host processor to detect the start of each packet from a stream of data as well as the recognition of invalid packets.

The size and format of each packet depends on the packet type of which the preferred embodiment of the Interface supports three: command, response and event packets. Command packets are transmitted from the host processor to the Interface and contain both commands and arguments. Upon execution of the command, the Interface sends a response packet back to the host processor containing both an error code and arguments, if appropriate. Finally, event packets are generated by the Interface in response to user-actions such as button presses, button releases or movement of the cursor within a specific region.

The three layers of the Interface accept commands, generate responses and, in the case of regions, generate events based on a 15-bit addressing scheme embedded in each packet. The address is always contained in the second word of each packet regardless of packet type and is formatted as follows:

| 0 | T | TABLET | R | REGION |
|---|---|--------|---|--------| where:

| | |
|---|---|
| T | Tablet group bit (bit 14) indicating the address is directed to a group of tablets the number of which is contained in the tablet address. |
| TABLET | Tablet address (bits 10–13) indicating the address of the tablet or group to which a command or response is directed or generated. |
| R | Region group bit (bit 9) indicating the address is directed to a group of regions the number of which is contained in the region address. |
| REGION | Region address (bits 0–8) indicating the address of the region or group to which a command or response is directed or an event generated. |

This addressing scheme is analogous to a post office box address in which the tablet address refers to the post office and the region address to the particular box. In this regard, commands and responses at the tablet layer require only the tablet address—the region address ignored. Similarly, region commands, responses and events require both the tablet and region address.

Commands addressed to the device layer are specified with a tablet address, rather than device address, in order to facilitate the allocation of multiple logical tablets per physical device. This allocation may be performed by appropriate commands from the host processor and requires partitioning the physical device into one or more logical areas. Each area responds to commands directed to a particular tablet and generates event packets using tablet addresses for which which they have been assigned (see Interface Description: Event Processing below).

The format of a command packet issued to the Interface from the host processor is as follows:

| P | 0 | COMMAND | | 0 |
|---|---|---|---|---|
| 0 | T | TABLET | R | REGION |
| 0 | (ARGUMENT 1) | | | |
| 0 | (ARGUMENT 2) | | | |
| 0 | (ARGUMENT 3) | | | |
| 0 | (ARGUMENT 4) | | | | where:
- P      Phase bit (bit 15) which is set for the first packet word and clear for all other words.
- COMMAND      Numerical command identifier (bits 7–13) corresponding to one of the Interface commands.
- T      Tablet group (bit 15) address.
- TABLET      Tablet address (bits 10–13) to which the command is issued.
- R      Region group (bit 9) address.
- REGION      Region address (bits 0–8) to which the command is issued -- zero if command addresses only the tablet.
- ARGUMENT 1      Optional argument dependent on the command specified. Not present if the command does not take one or more arguments.
- ARGUMENT 2      Optional argument dependent on the command specified. Not present if the command does not take two or more arguments.
- ARGUMENT 3      Optional argument dependent on the command specified. Not present if the command does not take three or more arguments.
- ARGUMENT 4      Optional argument dependent on the command specified. Not present if the command does not take four or more arguments.

Command packets comprise between two and six words. Extra arguments to command packets are ignored while insufficient arguments result in packet rejection by the Interface. Typically, a host processor device driver will format the packet correctly for an application program though this capability can be over-ridden.

Response packets can take one of two forms—command acknowledgement or command response—depending on the particular command and whether it executed successfully. Response packets aare formatted as follows:

| P | S | COMMAND | | RESULT |
|---|---|---|---|---|
| 0 | 0 | TABLET | R | REGION |
| 0 | (ARGUMENT 1) | | | |
| 0 | (ARGUMENT 2) | | | |
| 0 | (ARGUMENT 3) | | | |
| 0 | (ARGUMENT 4) | | | | where:
- P      Phase bit (bit 15) which is set for the first packet word and clear for all other words.
- S      Status bit (bit 14) which is set for a response packet.
- COMMAND      Numerical command identifier (bits 7–13) corresponding to one of the Interface commands.
- RESULT      Result code (bits 0–6) which is zero if the command executed successfully or an error code if not.
- TABLET      Tablet address (bits 10–13) to which the command is issued.
- R      Region group (bit 9) address.
- REGION      Region address (bits 0–8) to which the command is issued -- zero if command addresses only the tablet.
- ARGUMENT 1      Optional argument dependent on the command specified. Not present if the command does not return one or more arguments or an error occurred.
- ARGUMENT 2      Optional argument dependent on the command specified. Not present if the command does not return three or more arguments or an error occurred.
- ARGUMENT 3      Optional argument dependent on the command specified. Not present if the command does not return three or more arguments or an error occurred.

| | | | | | | |
|---|---|---|---|---|---|---|
| ARGUMENT 4 | Optional argument dependent on the command specified. Not present if the command does not return four or more arguments or an error occurred. | | | | | |

Commands which execute successfully and do not request information from the Interface never return their arguments—only the command and result codes in the first packet word and the address to which the command was directed in the second. The packet size for these packets is always two words.

Similarly, commands which execute and result in an error never return arguments regardless of the command type—only the command and non-zero result code in the first packet word and the address to which the command was directed in the second. The packet size for these packets is always two words.

Finally, commands which request information from the Interface and execute successfully return the command and zero result code in the first packet word, the address to which the command was directed in the second and one or more arguments in the successive packet words. The packet size for these packets is dependent upon the particular command and comprise between three to six words.

The most common packets encountered are event packets which are generated from the region layer in response to some user-action such as pressing or releasing a button and moving the cursor. Event packets take two forms depending on whether coordinate data has been enabled. The format for event packets is as follows:

dependent on whether coordinates are present and can comprise either two or four words.

Packet Decoding

Figure 4:
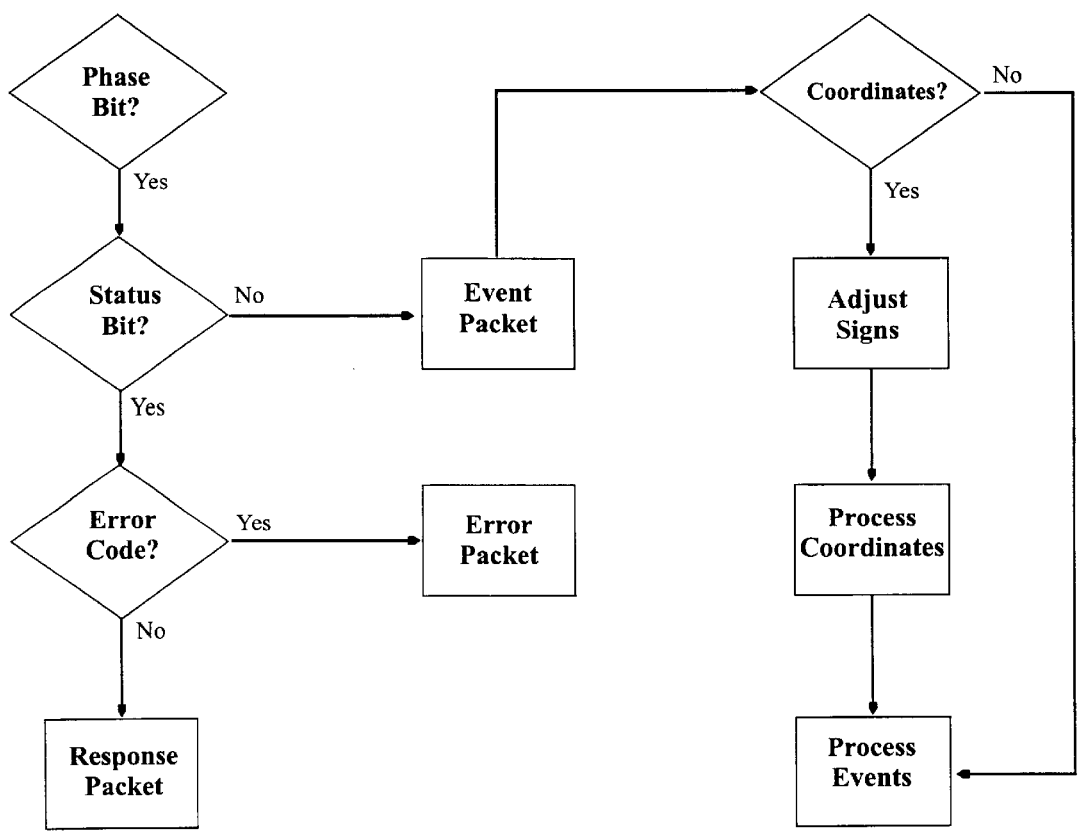
FIG. 4. is a flowchart depicting a packet decoding process.

Referring to FIG. 4, one possible method of the packet decoding for a host processor is illustrated. The processing loop begins with the receipt of a packet word which is first checked for the presence of the phasing bit in the most-significant bit. If it is set, the second in most-significant bit is then checked to determine whether the remaining packet words constitute an event or command response packet.

If the status bit is set, the packet is a command response and the error code is tested for a non-zero value. A zero error code indicates the command requested executed successfully and the arguments, if requested by command context, are present and may be interpreted. Otherwise, an error occurred, the arguments are not present and the command code should be examined to determine which command did not execute. Error packets always return the command and error code in the first packet word, and the address of the command in the second.

If the status bit is clear, the packet is an event packet which contains the event in the remaining bits of the first packet word, the address of the packet in the second packet word and the X and Y coordinates, if present, in the third and four packet words. The Coordinate bit (bit 8) will be set in the first packet word (event word) if the coordinates are

| P | S | X | Y | 0 | 0 | R | C | UP | DOWN |
|---|---|---|---|---|---|---|---|---|---|
| 0 | 0 | TABLET | | | 0 | REGION | | | |
| 0 | (X COORDINATE) | | | | | | | | |
| 0 | (Y COORDINATE) | | | | | | | | | where:
- P      Phase bit (bit 15) which is set for the first packet word and clear for all other words.
- S      Status bit (bit 14) which is clear for an event packet.
- X      Sign bit (bit 13) for the X coordinate (if present).
- Y      Sign bit (bit 12) for the Y coordinate (if present).
- R      Coordinates (bit 9) are relative from the last valid event.
- C      Coordinates present (bit 8); used in conjunction with relative bit.
- UP      Button(s) 1–4 were released (bits 1, 3, 5, and 7 respectively).
- DOWN      Button(s) 1–4 were pressed (bits 0, 2, 4, and 6 respectively).
- TABLET      Tablet address (bit 10–13) issuing the event.
- REGION      Region address (bits 0–8) issuing the event.
- X COORDINATE      If coordinate bit set in first packet word, contains the X coordinate where the event occurred.
- Y COORDINATE      If coordinate bit set in first packet word, contains the Y coordinate where the event occurred.

Unlike response or command packets, event packets do not contain command or error codes but instead a bit mask indicating the type of events which occurred and whether the packet contains coordinate data. Event packets are only generated from within regions and therefore the region address is always valid. The packet size for event packets is present and the Relative bit (bit 9) will be set if the coordinates are relative to the last reported position. The coordinate values are further modified with the presence of the X and Y sign bits (bits 13 and 12) in the event word if the coordinates are negative.

Decoding the coordinates of the event packet requires testing for the presence of the Coordinate bit in the event word. If absent, the remaining coordinate tests and adjustments are skipped. Then, the sign bit for each coordinate value (X and Y) are tested and, if set, require setting the most-significant bit in each coordinate word to indicate the coordinate is negative in two's complement binary notation.

Command Set

The command set of the Interface can be grouped into five major categories: control, coordinates, events, macros and procedures, which are summarized as follows:

CONTROL Control commands govern the creation and operation of each layer such as initializing the physical device, controlling tablet layer properties or the flow of information to the host processor.

COORDINATES Coordinate commands govern the coordinate system properties of each layer such as transformation, scaling, and rotation in addition to the creation of regions at the region layer.

EVENTS Event commands govern the types of user-actions which trigger an event within a given region and are applicable only at the region layer.

MACROS Macro commands govern the capture, playback and release of region events and are applicable only at the tablet layer.

PROCEDURES Procedure commands govern the capture and subsequent execution of commands within a given region and encompass the embedded programming language of the Interface.

Macros and Stored Procedures are powerful extensions to the Interface which permit the storage and retrieval of events and commands, respectively. They encompass all packet types of the Interface and are mutually exclusive in that regions with Stored Procedures may not be included in macros.

Macros are used to record user-generated events such as button presses and releases or the movement of the cursor within a region for which a Stored Procedure has not been defined. Once recorded, macros may be "replayed" through the packet queue and delivered to the host processor any number of times.

Macros record and play events only within regions which: 1) are activated by some user-action such as a button press, button release or cursor movement; 2) satisfy the event mask defined for that region; 3) are enabled; and 4) do not contain a Stored Procedure. The type and size of packet recorded depends on whether coordinate reporting is enabled.

Stored Procedures are used to record Interface command sequences within a region which are subsequently executed upon the following conditions: 1) the region is activated by some user-action such as a button press, button release or cursor movement; 2) the event satisfies the event mask defined for that region; 3) the region is enabled; and 4) a Stored Procedure has been defined.

Since regions are often used to signal user commands to an application program, macros may trigger multiple commands to the application each time they are replayed. This is in contrast to Stored Procedures which execute stored commands without application intervention.

Many commands are applicable only to specific layers and govern the context in which the command is executed. Command groups and the layers to which they apply are as follows:

| DEVICE | TABLET | REGION |
|---|---|---|
| | CONTROL | |
| Reset | Open | Open |
| Flush | Close | Close |
| Version | Enable | Get |
| Open | Disable | Move |
| Close | Set Group | Enable |
| | Get Group | Disable |
| | | Set Group |
| | | Get Group |
| | COORDINATES | |
| Get Axis | Set Extents | Set Extents |
| Get Extents | Get Extents | Get Extents |
| Get Resolution | Set Resolution | Set Resolution |
| | Get Resolution | Get Resolution |
| | | Set Origin |
| | | Get Origin |
| | | Set Rotation |
| | | Get Rotation |
| | EVENTS | |
| | | Set Mask |
| | | Get Mask |
| | MACROS | |
| | Open | |
| | End | |
| | Play | |
| | Close | |
| | PROCEDURES | |
| | Enable Reports | Open |
| | Disable Reports | End |
| | | Execute |
| | | Close |

Each command of the Interface is listed below along with a description of its action, packet formats and arguments, errors returned and related commands.

1. Reset Device

Performs a hardware reset to the Interface which closes the current device and clears all queues.

COMMAND PACKET

| P | 0 | | 0H | | 0 |
|---|---|---|---|---|---|
| 0 | T | | TABLET | 0 | 0 |

RESPONSE PACKET

| P | S | | 0H | | ERROR CODE |
|---|---|---|---|---|---|
| 0 | 0 | | TABLET | 0 | 0 |

Errors Returned

Reset executed successfully, Interface CPU malfunction, Interface ROM checksum failed, Interface memory malfunction or Interface program I/O malfunction.

Related Commands

Flush Device and Close Device.

2. Flush Device

Clears the packet queue removing packets queued but not yet delivered.

COMMAND PACKET

| P | 0 | 1H | | 0 |
|---|---|---|---|---|
| 0 | T | TABLET | 0 | 0 |

RESPONSE PACKET

| P | S | 1H | ERROR CODE |
|---|---|---|---|
| 0 | 0 | TABLET | 0 | 0 |

Errors Returned

Packet queue flushed successfully.

Related Commands

Reset Device.

3. Get Version

Returns die Interface firmware version in the third packet word.

COMMAND PACKET

| P | | 2H | | 0 |
|---|---|---|---|---|
| 0 | T | TABLET | 0 | 0 |

RESPONSE PACKET

| P | S | 2H | ERROR CODE |
|---|---|---|---|
| 0 | | TABLET | 0 | 0 |
| 0 | | VERSION | | |

Errors Returned

Version returned successfully.

Related Commands

Reset Device.

4. Open Device

Opens the device for the device number contained in the third packet word.

COMMAND PACKET

| P | | 3H | | 0 |
|---|---|---|---|---|
| 0 | T | TABLET | 0 | 0 |
| 0 | | DEVICE NUMBER | | |

RESPONSE PACKET

| P | S | 3H | ERROR CODE |
|---|---|---|---|
| 0 | 0 | TABLET | 0 | 0 |

Errors Returned

Device opened successfully, device already open or device number not supported.

Related Commands

Reset Device and Close Device.

5. Get Device Axis

Returns the physical device size in 2 mil inch increments. The horizontal size is returned in the third packet word and the vertical size in the fourth packet word.

COMMAND PACKET

| P | | 4H | | 0 |
|---|---|---|---|---|
| 0 | T | TABLET | 0 | 0 |

RESPONSE PACKET

| P | S | 4H | ERROR CODE |
|---|---|---|---|
| 0 | 0 | TABLET | 0 | 0 |
| 0 | | X AXIS (2 MIL) | | |
| 0 | | Y AXIS (2 MIL) | | |

Errors Returned

Device axis returned successfully or device not open.

Related Commands

Get Device Extents and Get Device Resolution.

6. Get Device Extents

Returns the current device extents, or counts per axis in 2 mil increments. The horizontal extent is returned in the third packet word and the vertical extent in the fourth packet word.

COMMAND PACKET

| P | 0 | 5H | | 0 |
|---|---|---|---|---|
| 0 | T | TABLET | 0 | 0 |

RESPONSE PACKET

| P | S | 5H | ERROR CODE |
|---|---|---|---|
| 0 | 0 | TABLET | 0 | 0 |
| 0 | | X EXTENT (2 MIL) | | |
| 0 | | Y EXTENT (2 MIL) | | |

Errors Returned

Device extents returned successfully or device not open.

Related Commands

Get Device Axis and Get Device Resolution.

7. Get Device Resolution

Returns the current device resolution in counts per inch. The horizontal resolution is returned in the third packet word and the vertical resolution in the fourth packet word.

COMMAND PACKET

| P | 0 | 6H | | 0 |
|---|---|---|---|---|
| 0 | T | TABLET | 0 | 0 |

RESPONSE PACKET

| P | S | 6H | ERROR CODE |
|---|---|---|---|
| 0 | 0 | TABLET | 0 | 0 |
| 0 | | X RESOLUTION | | |
| 0 | | Y RESOLUTION | | |

Errors Returned

Device resolution returned successfully or device not open.

Related Commands

Get Device Axis and Get Device Extents.

8. Close Device

Closes and invalidates the current device. Tablet must be closed prior to this call.

COMMAND PACKET

| P |   | 7H     |   | 0 |
|---|---|--------|---|---|
|   | T | TABLET | 0 | 0 |

RESPONSE PACKET

| P | S | 7H     |   | ERROR CODE |
|---|---|--------|---|------------|
| 0 | 0 | TABLET | 0 | 0          |

Errors Returned

Device closed successfully, device not open or tablet still open.

Related Commands

Open Device and Reset Device.

9. Open Tablet

Opens the tablet layer with the coordinate system set to extents of 32,767, macro queue empty, no regions defined and procedure reports disabled (−1). Device must be opened successfully first.

COMMAND PACKET

| P | 0 | 8H     |   | 0 |
|---|---|--------|---|---|
| 0 | T | TABLET | 0 | 0 |

RESPONSE PACKET

| P | S | 8H     |   | ERROR CODE |
|---|---|--------|---|------------|
| 0 | 0 | TABLET | 0 | 0          |

Errors Returned

Tablet opened successfully, device not open, tablet already open or device does not respond.

Related Commands

Close Tablet.

10. Close Tablet

Closes the tablet layer, all regions and the macro queue.

COMMAND PACKET

| P | 0 | 9H     |   | 0 |
|---|---|--------|---|---|
| 0 | T | TABLET | 0 | 0 |

RESPONSE PACKET

| P | S | 9H     |   | ERROR CODE |
|---|---|--------|---|------------|
| 0 | 0 | TABLET | 0 | 0          |

Errors Returned

Tablet closed successfully, device not open or tablet not open.

Related Commands

Open Device and Open Tablet.

11. Enable Tablet

Enables tablet layer and all previously enabled regions for user-event generation, macro recording and execution of Stored Procedures.

COMMAND PACKET

| P | 0 | 0AH    |   | 0 |
|---|---|--------|---|---|
| 0 | T | TABLET | 0 | 0 |

RESPONSE PACKET

| P | S | 0AH    |   | ERROR CODE |
|---|---|--------|---|------------|
| 0 | 0 | TABLET | 0 | 0          |

Errors Returned

Tablet enabled successfully, device not open or tablet not open.

Related Commands

Disable Tablet, Enable Region and Disable Region.

12. Disable Tablet

Disables tablet layer and all regions (but not each region individually) for user-event generation, macro recording and execution of Stored Procedures.

COMMAND PACKET

| P | 0 | 0BH    |   | 0 |
|---|---|--------|---|---|
| 0 | T | TABLET | 0 | 0 |

RESPONSE PACKET

| P | S | 0BH    |   | ERROR CODE |
|---|---|--------|---|------------|
| 0 | 0 | TABLET | 0 | 0          |

Errors Returned

Tablet disabled successfully, device not open or tablet not open.

Related Commands

Enable Tablet, Enable Region and Disable Region.

13. Set Tablet Extents

Sets the X and Y extents of the tablet coordinate system to the third and fourth packets, respectively, which must be established prior to creating any regions. Implicitly changes the tablet resolution. An argument of zero leaves the extent unchanged.

COMMAND PACKET

| P | 0 | 0CH      |   | 0 |
|---|---|----------|---|---|
| 0 | T | TABLET   | 0 | 0 |
| 0 |   | X EXTENT |   |   |
| 0 |   | Y EXTENT |   |   |

RESPONSE PACKET

| P | S | 0CH    |   | ERROR CODE |
|---|---|--------|---|------------|
| 0 | 0 | TABLET | 0 | 0          |

Errors Returned

Tablet extents changed successfully, device not open, tablet not open or one or more regions defined.

Relates Commands

Get Tablet Extents, Set Tablet Resolution and Get Tablet Resolution.

14. Get Tablet Extents

Returns the X and Y tablet extents in packet words three and four, respectively.

COMMAND PACKET

| P | 0 | 0DH | | 0 |
|---|---|---|---|---|
| 0 | T | TABLET | 0 | 0 |

RESPONSE PACKET

| P | S | 0DH | | ERROR CODE |
|---|---|---|---|---|
| 0 | 0 | TABLET | 0 | 0 |
| 0 | | X EXTENT | | |
| 0 | | Y EXTENT | | |

Errors Returned

Tablet extents returned successfully, device not open or tablet not open.

Related Commands

Set Tablet Extents, Set Tablet Resolution and Get Tablet Resolution.

15. Set Tablet Resolution

Sets the tablet X and Y resolution in counts per inch to the values contained in packet words three and four, respectively. The tablet coordinate system must be configured before regions defined and the extents resulting from the new resolution cannot exceed 32,767. Changing the tablet resolution implicitly changes tablet extents. An argument of zero leaves the resolution unchanged.

COMMAND PACKET

| P | 0 | 0EH | | 0 |
|---|---|---|---|---|
| 0 | T | TABLET | 0 | 0 |
| 0 | | X RESOLUTION | | |
| 0 | | Y RESOLUTION | | |

RESPONSE PACKET

| P | S | 0EH | | ERROR CODE |
|---|---|---|---|---|
| 0 | 0 | TABLET | 0 | 0 |

Errors Returned

Tablet resolution changed successfully, device not open, tablet not open, one or more regions defined or maximum tablet extents exceeded.

Related Commands

Get Tablet Resolution, Set Tablet Extents and Get Tablet Extents.

16. Get Tablet Resolution

Returns the X and Y tablet resolution, in counts per inch, in the third and fourth packet words, respectively.

COMMAND PACKET

| P | 0 | 0FH | | 0 |
|---|---|---|---|---|
| 0 | T | TABLET | 0 | 0 |

RESPONSE PACKET

| P | S | 0FH | | ERROR CODE |
|---|---|---|---|---|
| 0 | 0 | TABLET | 0 | 0 |
| 0 | | X RESOLUTION | | |
| 0 | | Y RESOLUTION | | |

Errors Returned

Tablet resolution returned successfully, device not open or tablet not open.

Related Commands

Set Tablet Resolution, Set Tablet Extents and Get Tablet Extents.

17. Set Tablet Group

Reserved for network configurations only: sets the tablet (or tablet group) contained in the address to the group number contained in the third packet word.

COMMAND PACKET

| P | 0 | 10H | | 0 |
|---|---|---|---|---|
| 0 | T | TABLET | 0 | 0 |
| 0 | | TABLET GROUP | | |

RESPONSE PACKET

| P | S | 10H | | ERROR CODE |
|---|---|---|---|---|
| 0 | 0 | TABLET | 0 | 0 |

Errors Returned

Tablet group changed successfully, device not open, tablet not open or single-user configuration.

Related Commands

Get Tablet Group, Set Region Group and Get Region Group.

18. Get Tablet Group

Reserved for network configurations only: returns the tablet group number in the third packet word for the tablet (or tablet group) addressed.

COMMAND PACKET

| P | 0 | 11H | | 0 |
|---|---|---|---|---|
| 0 | T | TABLET | 0 | 0 |

RESPONSE PACKET

| P | S | 11H | | ERROR CODE |
|---|---|---|---|---|
| 0 | 0 | TABLET | 0 | 0 |
| 0 | | TABLET GROUP | | |

Errors Returned

Tablet group returned successfully, device not open, tablet not open or single-user configuration.

Related Commands

Set Tablet Group, Set Region Group and Get Region Group.

19. Open Macro

Opens the macro queue for recording user-events which may be subsequently replayed with the Play Macro command. Inserts a copy of the response packet into the macro queue.

COMMAND PACKET

| P | 0 | 12H | | 0 |
|---|---|---|---|---|
| 0 | T | TABLET | 0 | 0 |

RESPONSE PACKET

| P | S | 12H | | ERROR CODE |
|---|---|---|---|---|
| 0 | 0 | TABLET | 0 | 0 |

Errors Returned

Macro opened successfully, device not open, tablet not open, macro already open or insufficient memory for macro queue.

Related Commands

End Macro, Play Macro and Close Macro.

20. End Macro

Ends recording user-events in the macro queue which may be subsequently replayed with the Play Macro command. Inserts a copy of the response packet into the macro queue.

COMMAND PACKET

| P | 0 | 13H | | 0 |
|---|---|---|---|---|
| 0 | T | TABLET | 0 | 0 |

RESPONSE PACKET

| P | S | 13H | | ERROR CODE |
|---|---|---|---|---|
| 0 | 0 | TABLET | 0 | 0 |

Errors Returned

Macro ended successfully, device not open, tablet not open, macro not open or recording in progress.

Related Commands

Open Macro, Play Macro and Close Macro.

21. Play Macro

Copies the macro queue to the packet queue for delivery to the Application. Macro events are bounded by Open Macro and End Macro response packets.

COMMAND PACKET

| P | 0 | 14H | | 0 |
|---|---|---|---|---|
| 0 | T | TABLET | 0 | 0 |

RESPONSE PACKET

| P | S | 14H | | ERROR CODE |
|---|---|---|---|---|
| 0 | 0 | TABLET | 0 | 0 |

Errors Returned

Macro played successfully, device not open, tablet not open, macro not open, macro recording in progress or insufficient memory for macro events.

Related Commands

Open Macro, End Macro and Close Macro.

22. Close Macro

Closes and discards the macro queue which may be subsequently reopened for recording user-events.

COMMAND PACKET

| P | 0 | 15H | | 0 |
|---|---|---|---|---|
| 0 | T | TABLET | 0 | 0 |

RESPONSE PACKET

| P | S | 15H | | ERROR CODE |
|---|---|---|---|---|
| 0 | 0 | TABLET | 0 | 0 |

Errors Returned

Macro closed successfully, device not open, tablet not open, macro recording in progress or macro not open.

Related Commands

Open Macro, End Macro and Play Macro.

23. Open Region

Creates a region in the tablet coordinate system bounded by the rectangle contained in packet words 3 through 6, which comprise two points in tablet coordinates: lower-left and upper-right. Upon opening, the regions defaults to a coordinate system comprising extents matching the bounding rectangle, an origin in the lower-left and zero rotation (resolution is device-dependent). The event mask defaults to all buttons up and down, coordinate reporting and the Stored Procedure undefined.

COMMAND PACKET

| P | 0 | 16H | | 0 |
|---|---|---|---|---|
| 0 | T | TABLET | 0 | REGION |
| 0 | | LOWER-LEFT (X) | | |
| 0 | | LOWER-LEFT (Y) | | |
| 0 | | UPPER-RIGHT (X) | | |
| 0 | | UPPER-RIGHT (Y) | | |

RESPONSE PACKET

| P | S | 16H | | ERROR CODE |
|---|---|---|---|---|
| 0 | 0 | TABLET | 0 | REGION |

Errors Returned

Region opened successfully, device not open, tablet not open, region already open, region bounds illegal or insufficient memory to open region.

Related Commands

Close Region and Close Tablet.

24. Move Region

Moves an existing region in the tablet coordinate system to the rectangle contained in packet words 3 through 6, which comprise two points in tablet coordinates: lower-left and upper-right. The regions coordinate system, Stored Procedure and event mask are unchanged.

COMMAND PACKET

| P | 0 | 17H | | 0 |
|---|---|---|---|---|
| 0 | T | TABLET | 0 | REGION |
| 0 | | LOWER-LEFT (X) | | |
| 0 | | LOWER-LEFT (Y) | | |
| 0 | | UPPER-RIGHT (X) | | |
| 0 | | UPPER-RIGHT (Y) | | |

RESPONSE PACKET

| P | S | 17H | | ERROR CODE |
|---|---|---|---|---|
| 0 | 0 | TABLET | 0 | REGION |

Errors Returned
Region moved successfully, device not open, tablet not open, region not open, region bounds illegal or insufficient memory to open region.
Related Commands
Open Region and Close Region.
25. Get Region
Returns the bounding rectangle in tablet coordinates of the region addressed.

COMMAND PACKET

| P | 0 | 18H | | 0 |
|---|---|---|---|---|
| 0 | T | TABLET | 0 | REGION |

RESPONSE PACKET

| P | S | 18H | | ERROR CODE |
|---|---|---|---|---|
| 0 | 0 | TABLET | 0 | REGION |
| 0 | | LOWER-LEFT (X) | | |
| 0 | | LOWER-LEFT (Y) | | |
| 0 | | UPPER-RIGHT (X) | | |
| 0 | | UPPER-RIGHT (Y) | | |

Errors Returned
Region returned successfully, device not open, tablet not open or region not open.
Related Commands
Open Region and Move Region.
26. Close Region
Closes the region addressed and destroys its Stored Procedure, if defined.

COMMAND PACKET

| P | 0 | 19H | | 0 |
|---|---|---|---|---|
| 0 | T | TABLET | R | REGION |

RESPONSE PACKET

| P | S | 19H | | ERROR CODE |
|---|---|---|---|---|
| 0 | 0 | TABLET | R | REGION |

Errors Returned
Region closed successfully, device not open, tablet not open or region does not exist.
Related Commands
Open Region and Close Tablet.
27. Enable Region
Enables the generation of user-events or execution of Stored Procedures for the region (or region group) addressed.

COMMAND PACKET

| P | 0 | 1AH | | 0 |
|---|---|---|---|---|
| 0 | T | TABLET | R | REGION |

RESPONSE PACKET

| P | S | 1AH | | ERROR CODE |
|---|---|---|---|---|
| 0 | 0 | TABLET | R | REGION |

Errors Returned
Region enabled successfully, device not open, tablet not open or region does not exist.
Related Commands
Disable Region, Enable Tablet and Disable Tablet.
28. Disable Region
Disables the generation of user-events or execution of Stored Procedures for the region (or region group) addressed.

COMMAND PACKET

| P | 0 | 1BH | | 0 |
|---|---|---|---|---|
| 0 | T | TABLET | R | REGION |

RESPONSE PACKET

| P | S | 1BH | | ERROR CODE |
|---|---|---|---|---|
| 0 | 0 | TABLET | R | REGION |

Errors Returned
Region disabled successfully, device not open, tablet not open or region not open.
Related Commands
Enable Region, Enable Tablet and Disable Tablet.
29. Set Region Group
Sets the region (or region group) to the region group number contained in the third packet word.

COMMAND PACKET

| P | 0 | 1CH | | 0 |
|---|---|---|---|---|
| 0 | T | TABLET | R | REGION |
| 0 | | GROUP | | |

RESPONSE PACKET

| P | S | 1CH | | ERROR CODE |
|---|---|---|---|---|
| 0 | 0 | TABLET | R | REGION |

Errors Returned
Region group changed successfully, device not open, tablet not open or region not open.
Related Commands
Get Region Group, Set Tablet Group and Get Tablet Group.
30. Get Region Group
Returns the region group number in the third packet word for the region addressed.

COMMAND PACKET

| P | 0 | 1DH | | 0 |
|---|---|---|---|---|
| 0 | T | TABLET | 0 | REGION |

RESPONSE PACKET

| P | S | 1DH | | ERROR CODE |
|---|---|---|---|---|
| 0 | 0 | TABLET | 0 | REGION |
| | | GROUP | | |

Errors Returned

Region group returned successfully, device not open, tablet not open or region not open.

Related Commands

Set Region Group, Set Tablet Group and Get Tablet Group.

31. Set Region Mask

Sets the regions mask for the region (or region group) to the mask contained in the third packet word.

COMMAND PACKET

| P | 0 | 1EH | | 0 |
|---|---|---|---|---|
| 0 | T | TABLET | R | REGION |
| 0 | | MASK | | |

RESPONSE PACKET

| P | S | 1EH | | ERROR CODE |
|---|---|---|---|---|
| 0 | 0 | TABLET | R | REGION |

Errors Returned

Region mask changed successfully, device not open, tablet not open, region not open or region mask invalid.

Related Commands

Get Region Mask.

32. Get Region Mask

Returns the region mask in the third packet word for the region addressed.

COMMAND PACKET

| P | 0 | 1FH | | 0 |
|---|---|---|---|---|
| 0 | T | TABLET | 0 | REGION |

RESPONSE PACKET

| P | S | 1FH | | ERROR CODE |
|---|---|---|---|---|
| 0 | 0 | TABLET | 0 | REGION |
| 0 | | MASK | | |

Errors Returned

Region group returned successfully, device not open, tablet not open or region not open.

Related Commands

Set Region Mask.

33. Set Region Extents

Sets the regional coordinate system X and Y extents of the region (or region group) to the third and fourth packets, respectively. Implicitly changes the region resolution. An argument of zero leaves the extent unchanged.

COMMAND PACKET

| P | 0 | 20H | | 0 |
|---|---|---|---|---|
| 0 | T | TABLET | R | REGION |
| 0 | | X EXTENT | | |
| 0 | | Y EXTENT | | |

RESPONSE PACKET

| P | S | 20H | | ERROR CODE |
|---|---|---|---|---|
| 0 | 0 | TABLET | R | REGION |

Errors Returned

Region extents changed successfully, device not open, tablet not open or region not open.

Related Commands

Get Region Extents, Set Region Resolution and Get Region Resolution.

34. Get Region Extents

Returns the regional coordinate system X and Y extents in packet words three and four, respectively.

COMMAND PACKET

| P | 0 | 21H | | 0 |
|---|---|---|---|---|
| 0 | 0 | TABLET | 0 | REGION |

RESPONSE PACKET

| P | S | 21H | | ERROR CODE |
|---|---|---|---|---|
| 0 | 0 | TABLET | 0 | REGION |
| 0 | | X EXTENT | | |
| 0 | | Y EXTENT | | |

Errors Returned

Tablet extents returned successfully, device not open, tablet not open or region not open.

Related Commands

Set Region Extents, Set Region Resolution and Get Region Resolution.

35. Set Region Resolution

Sets the X and Y resolution of the region coordinate system to the third and fourth packets, respectively, and implicitly changes the region extents. An argument of zero leaves the resolution unchanged. The resulting region extents from the new resolution cannot exceed 32,767.

COMMAND PACKET

| P | 0 | 22H | | 0 |
|---|---|---|---|---|
| 0 | T | TABLET | R | REGION |
| 0 | | X RESOLUTION | | |
| 0 | | Y RESOLUTION | | |

RESPONSE PACKET

| P | S | 22H | | ERROR CODE |
|---|---|---|---|---|
| 0 | 0 | TABLET | R | REGION |

Errors Returned

Region resolution changed successfully, device not open, tablet not open, region not open or region maximum extents exceeded.

Related Commands

Set Region Extents, Get Region Extents and Get Region Resolution.

36. Get Region Resolution

Returns the X and Y region resolution in packet words three and four, respectively.

COMMAND PACKET

| P | 0 | 23H | | 0 |
|---|---|-----|---|---|
| 0 | T | TABLET | 0 | REGION |

RESPONSE PACKET

| P | S | 23H | | ERROR CODE |
|---|---|-----|---|------------|
| 0 | 0 | TABLET | 0 | REGION |
| 0 | | X RESOLUTION | | |
| 0 | | Y RESOLUTION | | |

Errors Returned

Region resolution returned successfully, device not open, tablet not open or region not open.

Related Commands

Set Region Extents, Get Region Extents and Set Region Resolution.

37. Set Region Origin

Sets the coordinate system X and Y origin of the region (or region group) addressed to the third and fourth packets, respectively.

COMMAND PACKET

| P | 0 | 24H | | 0 |
|---|---|-----|---|---|
| 0 | T | TABLET | R | REGION |
| 0 | | X ORIGIN | | |
| 0 | | Y ORIGIN | | |

RESPONSE PACKET

| P | S | 24H | | ERROR CODE |
|---|---|-----|---|------------|
| 0 | 0 | TABLET | R | REGION |

Errors Returned

Region origin changed successfully, device not open, tablet not open or region not open.

Related Commands

Set Region Extents, Get Region Extents, Get Region Resolution, Set Region Resolution and Get Region Origin.

38. Get Region Origin

Returns the regional coordinate system X and Y origin of the region addressed in packet words three and four, respectively.

COMMAND PACKET

| P | 0 | 25H | | 0 |
|---|---|-----|---|---|
| 0 | T | TABLET | 0 | REGION |

RESPONSE PACKET

| P | S | 25H | | ERROR CODE |
|---|---|-----|---|------------|
| 0 | 0 | TABLET | 0 | REGION |
| 0 | | X ORIGIN | | |
| 0 | | Y ORIGIN | | |

Errors Returned

Region origin returned successfully, device not open, tablet not open or region not open.

Related Commands

Set Region Extents, Get Region Extents, Set Region Resolution, Get Region Resolution and Set Region Origin.

39. Set Region Rotation

Sets the regional coordinate system rotation in degrees counter-clockwise of the region (or region group) to the third packet.

COMMAND PACKET

| P | 0 | 26H | | 0 |
|---|---|-----|---|---|
| 0 | T | TABLET | R | REGION |
| 0 | | ROTATION | | |

RESPONSE PACKET

| P | S | 26H | | ERROR CODE |
|---|---|-----|---|------------|
| 0 | 0 | TABLET | R | REGION |

Errors Returned

Region origin changed successfully, device not open, tablet not open or region not open.

Related Commands

Set Region Extents, Get Region Extents, Get Region Resolution, Set Region Resolution and Get Region Rotation.

40. Get Region Rotation

Returns the regional coordinate systems rotation of the region addressed in the third packet word.

COMMAND PACKET

| P | 0 | 27H | | 0 |
|---|---|-----|---|---|
| 0 | T | TABLET | 0 | REGION |

RESPONSE PACKET

| P | S | 27H | | ERROR CODE |
|---|---|-----|---|------------|
| 0 | 0 | TABLET | 0 | REGION |
| 0 | | ROTATION | | |

Errors Returned

Region rotation returned successfully, device not open, tablet not open or region not open.

Related Commands

Set Region Extents, Get Region Extents, Set Region Resolution, Get Region Resolution and Set Region Rotation.

41. Open Procedure

Opens a Stored Procedure for the region addressed. Subsequent commands are not executed but placed into the Stored Procedure until the receipt of the End Procedure command.

COMMAND PACKET

| P | 0 | 28H | | 0 |
|---|---|---|---|---|
| 0 | T | TABLET | 0 | REGION |

RESPONSE PACKET

| P | S | 28H | | ERROR CODE |
|---|---|---|---|---|
| 0 | 0 | TABLET | 0 | REGION |

Errors Returned

Procedure opened successfully, device not open, tablet not open, region not open, procedure already open or insufficient memory for procedure.

Related Commands

End Procedure, Execute Procedure and Close Procedure.

42. End Procedure

Ends a Stored Procedure definition which maybe subsequently executed either by a user-action or the Execute Procedure command.

COMMAND PACKET

| P | 0 | 29H | | 0 |
|---|---|---|---|---|
| 0 | T | TABLET | 0 | REGION |

RESPONSE PACKET

| P | S | 29H | | ERROR CODE |
|---|---|---|---|---|
| 0 | 0 | TABLET | 0 | REGION |

Errors Returned

Macro ended successfully, device not open, tablet not open, region not open or procedure not opened.

Related Commands

Open Procedure, Execute Procedure and Close Procedure.

43. Executive Procedure

Copies the Stored Procedure of the region addressed to the deferred execution queue for subsequent execution.

COMMAND PACKET

| P | 0 | 2AH | | 0 |
|---|---|---|---|---|
| 0 | T | TABLET | 0 | REGION |

RESPONSE PACKET

| P | S | 2AH | | ERROR CODE |
|---|---|---|---|---|
| 0 | 0 | TABLET | 0 | REGION |

Errors Returned

Procedure executed successfully, device not open, tablet not open, region not open, procedure not defined or insufficient memory for execution.

Related Commands

Open Procedure, End Procedure and Close Procedure.

44. Close Procedure

Closes the Stored Procedure for the region addressed.

COMMAND PACKET

| P | 0 | 2BH | | 0 |
|---|---|---|---|---|
| 0 | T | TABLET | R | REGION |

RESPONSE PACKET

| P | S | 2BH | | ERROR CODE |
|---|---|---|---|---|
| 0 | 0 | TABLET | R | REGION |

Errors Returned

Procedure closed successfully, device not open, tablet not open, region not open or procedure not defined.

Related Commands

Open Procedure, End Procedure and Execute Procedure.

45. Enable Procedure Reports

Increments the procedure report flag which by default on opening the tablet is −1. A zero or greater value for this flag enables procedure reports otherwise they are disabled.

COMMAND PACKET

| P | 0 | 2CH | | 0 |
|---|---|---|---|---|
| 0 | T | TABLET | 0 | 0 |

RESPONSE PACKET

| P | S | 2CH | | ERROR CODE |
|---|---|---|---|---|
| 0 | 0 | TABLET | 0 | 0 |

Errors Returned

Procedure executed successfully, device not open or tablet not open.

Related Commands

Disable Procedure Reports.

46. Disable Procedure Reports

Decrements the procedure report flag which by default on opening the tablet is −1. A zero or greater value for this flag enables procedure reports otherwise they are disabled.

COMMAND PACKET

| P | 0 | 2DH | | 0 |
|---|---|---|---|---|
| 0 | T | TABLET | 0 | 0 |

RESPONSE PACKET

| P | S | 2DH | | ERROR CODE |
|---|---|---|---|---|
| 0 | T | TABLET | 0 | 0 |

Errors Returned

Procedure closed successfully, device not open or tablet not open.

Related Commands

Enable Procedure Reports.

Circuit Description

Figure 5:
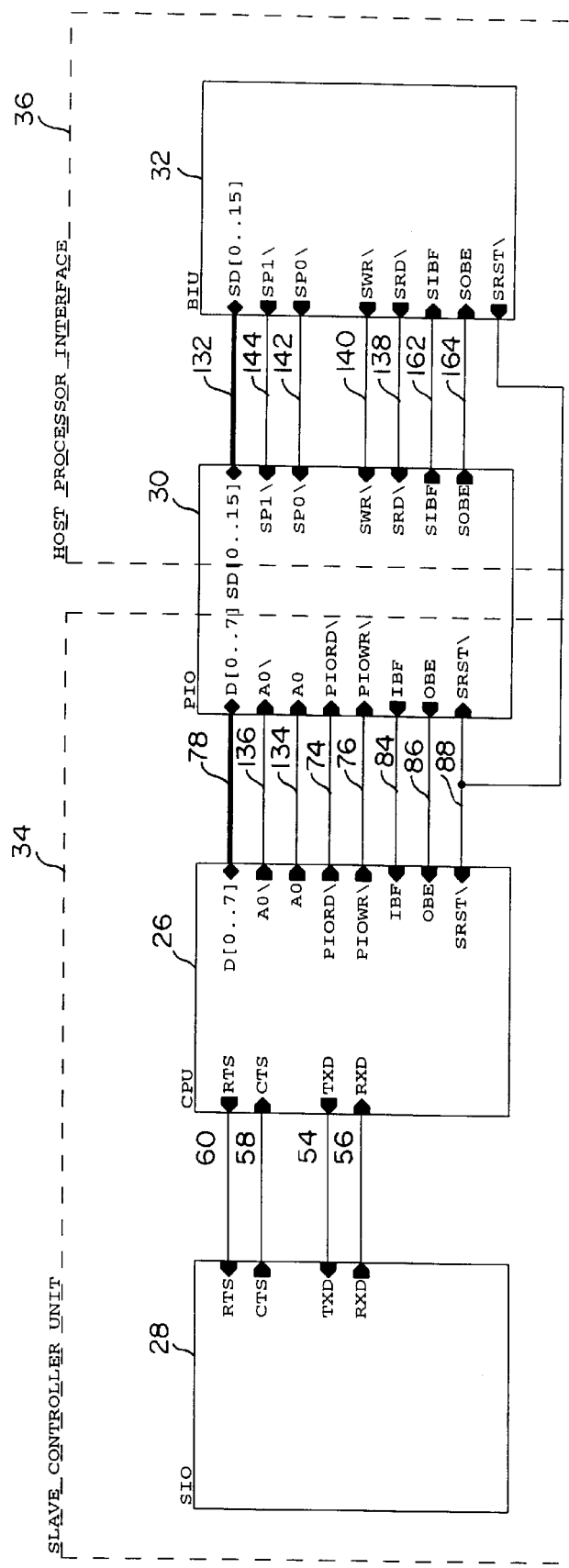
FIG. 5. is a block schematic of four circuits for the present invention.

Referring to FIG. 5, the Circuit for the preferred embodiment can be logically described as consisting of four basic circuits entitled: Central Processing Unit 26 ("CPU") further detailed in FIG. 6, Serial Input/Output 28 ("SIO") further detailed in FIG. 7, Programmed Input/Output 30 ("PIO") further detailed in FIG. 8, and the Bus Interface Unit 32 ("BIU") further detailed in FIG. 9. Of these, the CPU 26 and SIO 28 are dedicated units of the Slave Controller Unit 34 ("SCU") with the BIU dedicated to the Host Processor Interface 36 ("HPI").

Interfacing between circuit modules is largely dependent upon the function each performs and is discussed in detail under each module. However, in general, the following applies: The SIO 28 is responsible for converting between TTL and EIA-232C signals between the CPU 26 and digitizer.

The CPU 26 inputs and outputs these signals, manipulates, buffers or filters the data and outputs it to the PIO 30. In addition, it can receive instructions from data written to the PIO 30 from the BIU 32. As such, the CPU 26 is the repository for dedicated firmware which gives the entire circuit its unique application characteristics.

The PIO 30 is responsible for buffering two-way data exchanges between the CPU 26 and BIU 32, controlling the flow of data to avoid contention. The PIO 30 provides buffer memory and control signals for both the CPU 26 and BIU 32 and appears as memory mapped locations addressable anywhere within the address spaces of either the SCU 34 or HPI 36.

The BIU 32 is responsible for decoding the address and control signals from the host processor and channels data from the PIO 30 onto or off of the host data bus 132. It also provides reset 88 and startup signals to the CPU 26 and PIO 30 in order to maintain synchronization and initialization between the SCU 34 and HPI 36. It is the only module described herein which is dependent on the host system but provides host independent signals to the PIO 30. This means the BIU 32 can be changed to accommodate various host systems without changing the rest of the Circuit.

Central Processing Unit

Figure 6:
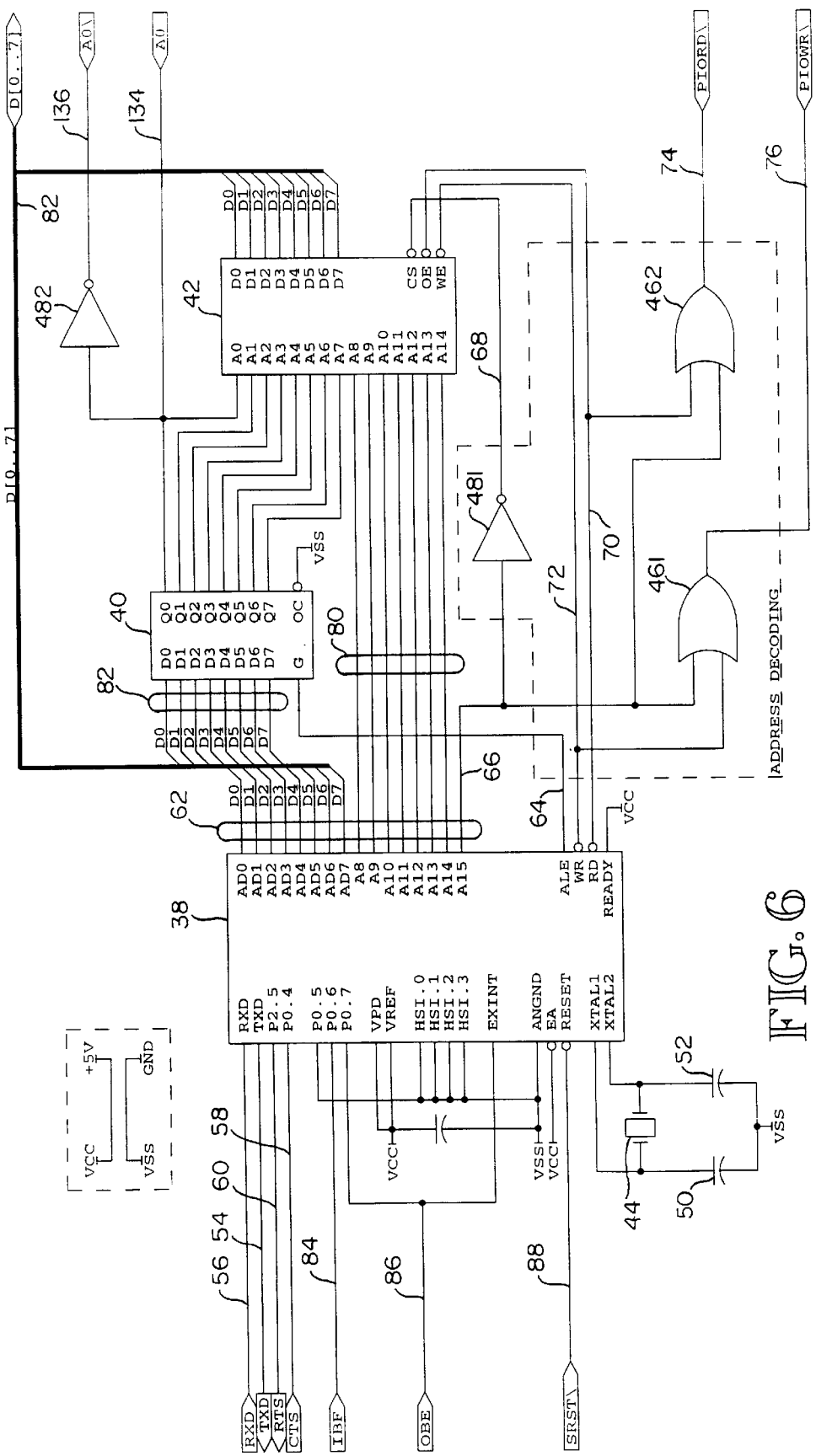
FIG. 6. is a schematic of the Central Processing Unit circuit for the present invention.

Referring to FIG. 6, the CPU consists of an embedded microprocessor 38, transparent latch 40, static ram 42, crystal 44 and logic gates 461–462 and 482.

Microprocessor 38 is an Intel 8398/8798 8/16 bit embedded controller featuring onboard serial communications, several levels of interrupts, on-chip timers and 8,192 bytes of either erasable programmable memory (EPROM on the 8798) or factory-masked read-only memory (ROM on the 8398). It is responsible for all application-specific operations such as data filtering and manipulation through the execution of instructions located in the EPROM/ROM space. In addition, it responds to interrupts from the PIO and either reads or writes data to the PIO and hence HPI.

The clock timing for the microprocessor 38 is provided via a clock crystal 44 connected to capacitors 50–52 grounded to match the parallel impedance of the crystal.

The microprocessor's on-chip serial port outputs its TTL data through pin TXD and inputs its TTL data through pin RXD. Both of these pins are connected to the SIO and the connections are labelled TXD 54 and RXD 56, respectively. In addition, communication handshaking signals CTS 58 and RTS 60 are connected to the SIO through pins P0.4 and P2.5 of the microprocessor 38, respectively, and are controlled by software instructions in ROM/EPROM.

The microprocessor 38 contains an external multiplexed address/data bus 62 partially latched by a transparent latch 40 on the falling edge of the address latch enable (ALE) 64 signal from the microprocessor 38 at the start of each bus-cycle. The transparent latch 40 latches the lower 8 bits of the 16 bit address/data bus 62 (pins AD0 through AD15 on the microprocessor 38) allowing data/address multiplexing. The output from the transparent latch 40 is held stable throughout the bus cycle and provides for additional address decoding in order to distinguish between data transfers to and from external memory and the PIO.

The address map for the CPU is as follows (all addresses in hexadecimal):

| FUNCTION | ADDRESS |
|---|---|
| Function Registers* | $0000–$00FF |
| PIO | $1000–$1001 |
| ROM/EPROM* | $2000–$3FFF |
| External Memory | $8000–$FFFF |

*These locations are internal to microprocessor 38.

External addressing is accomplished through inversion of address line 15 (A15) 66 on the microprocessor 38 through hex inverter 481 which provides an active-low signal 68 to the chip enable pin CS of the static ram 42. PIO addressing uses the address line 15 (A15) 66 line directly in combination with the read (RD\) 70 and write (WR\) 72 signals from the microprocessor 38 to distinguish between data transfers to and from the PIO. This is accomplished by connecting the address line 15 (A15) 66 signal and each WR\ 72 and RD\ 70 signals to 2-input positive-OR gates 461–462, respectively, forming active-low signals to the PIO labelled PIORD\ 74 and PIOWR\ 76, respectively. Finally, latched address line A0 134 from the transparent latch 40 is brought out to the PIO in both its nominal and inverted level (A0\) 136 through hex inverter 482. This signal, along with PIORD\ 74 and PIOWR\ 76, are further decoded in the PIO discussed further on.

External memory consists of static ram 42 which has 32,768 bytes of 8-bit read/write memory. Static ram 42 addressing is provided by the latched lower 8 bits 78 from the transparent latch 40 and direct connection to the high-order address bits 80 from the microprocessor 38. Data transfers between static ram 42 and the microprocessor 38 are made over the multiplexed address/data bus 82 on pins AD0 through AD7 of the microprocessor 38. Data transfer control is provided by the microprocessor 38 as active-low signals WR\(write) 72 and RD\(read) 70, respectively. These signals are directly connected to pins OE and WE of the static ram 42.

Inputs to the CPU include two active-high control signals indicating the state of the PIO data buffers labelled Input Buffer Full (IBF) 84 and Output Buffer Empty (OBE) 86. IBF 84 is connected to pin P0.6 of the microprocessor 38 and is sampled by software to determine its state. OBE 86 is connected to pin P0.7 of the microprocessor 38 where its state can be sampled and is also connected to the EXINT pin of the microprocessor 38 which is the external interrupt signal to the microprocessor 38. Therefore, IBF 84 and OBE 86 can both be sampled with OBE 86 optionally causing all software maskable interrupt to the microprocessor 38.

Finally, the microprocessor 38 receives a power-up, active-low reset signal labelled SRST\ 88 from the BIU connected to the RESET pin of the microprocessor 38. The microprocessor 38 is also capable of creating an active-low signal on this pin in order to provide asynchronous reset to other parts of the circuit. This is utilized by connecting the microprocessor's 38 reset pin to the PIO, the purpose of which is discussed further on.

Serial Input/Output

Figure 7:
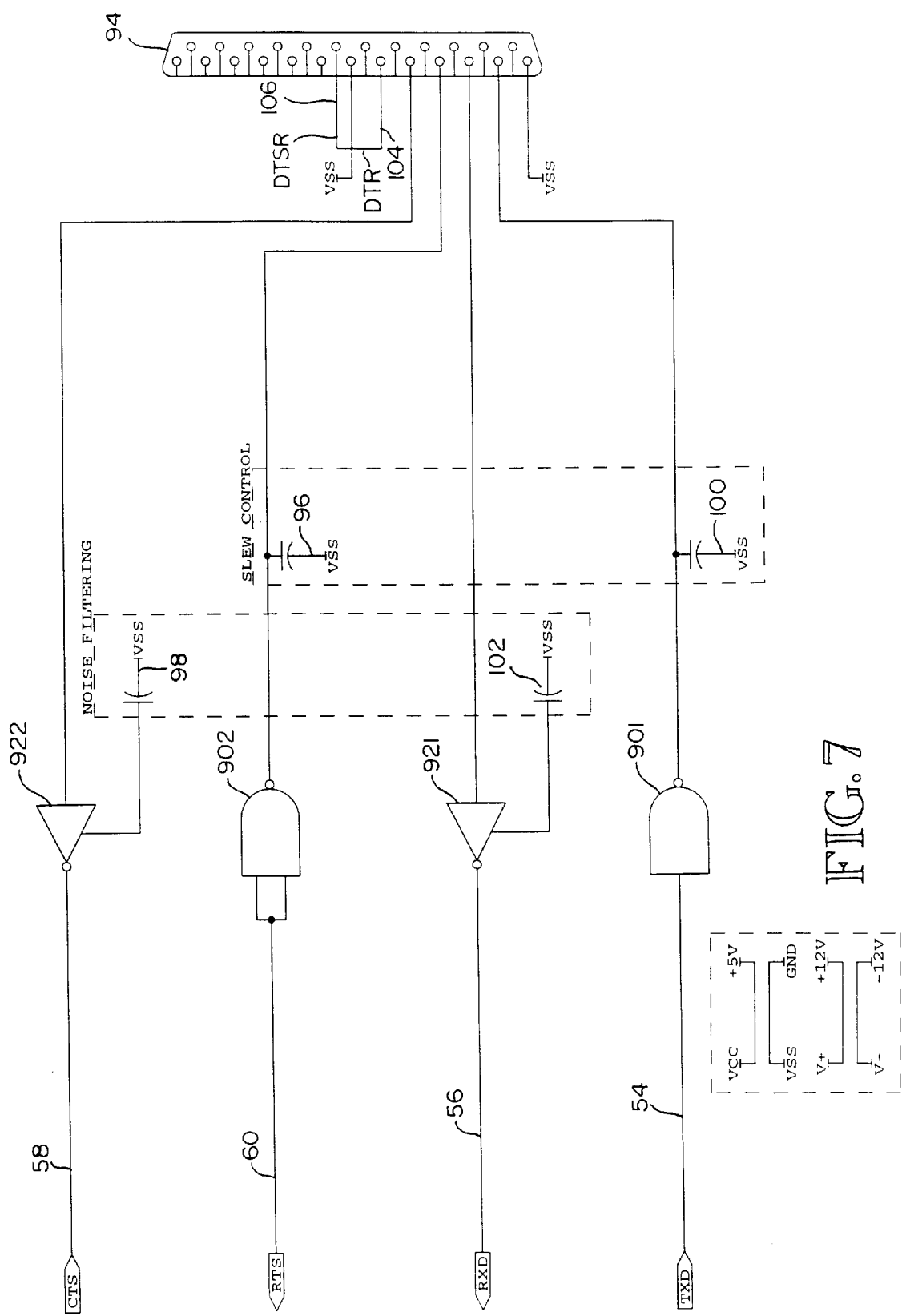
FIG. 7. is a schematic of the Serial Input/Output circuit for the present invention.

Referring to FIG. 7, the SIO unit consists of semiconductor components labeled 901–922. Components 901–902 are line drivers designed to Interface data terminal equipment (DTE) with data communications equipment (DCE) in conformance with the specifications of Electronics Industry Association (EIA) standard number EIA-232C. Components 921–922 are line receiver also designed to Interface DTE with DCE in conformance with EIA standard number EIA-232C.

Driver 902 converts the TTL signal labelled Request to Send (RTS) 60 and driver 901 the signal labelled Transmitted Data (TXD) 54 from the CPU to EIA-232C signals which are output through the DB25 male connector 94 located on the edge of the circuit card. Slew rate control for the rise and fall times of these signals is provided by capacitors 96 and 100 connected to circuit ground (VSS).

Receiver 922 performs a similar function converting the signal labelled Clear to Send (CTS) 58 and receiver 921 the signal labelled Received Data (RXD) 56 from the connector 94 into TTL level signals to the CPU. Noise filtering is provided by capacitors 98 and 102 connected to VSS which inhibit low-level noise on the communications line from issuing false logic levels. Finally, additional handshaking signals Data Terminal Ready (DTR) 104 and Data Set Ready (DSR) 106 on the connector 94 are interconnected for compatibility with existing peripherals and are not used by the circuit.

It should be noted that the pin assignments on the connector 94 are based on specifications of the PC/AT in conformance with EIA-232C and are not necessarily the same from host-to-host system.

Programmed Input/Output

Figure 8:
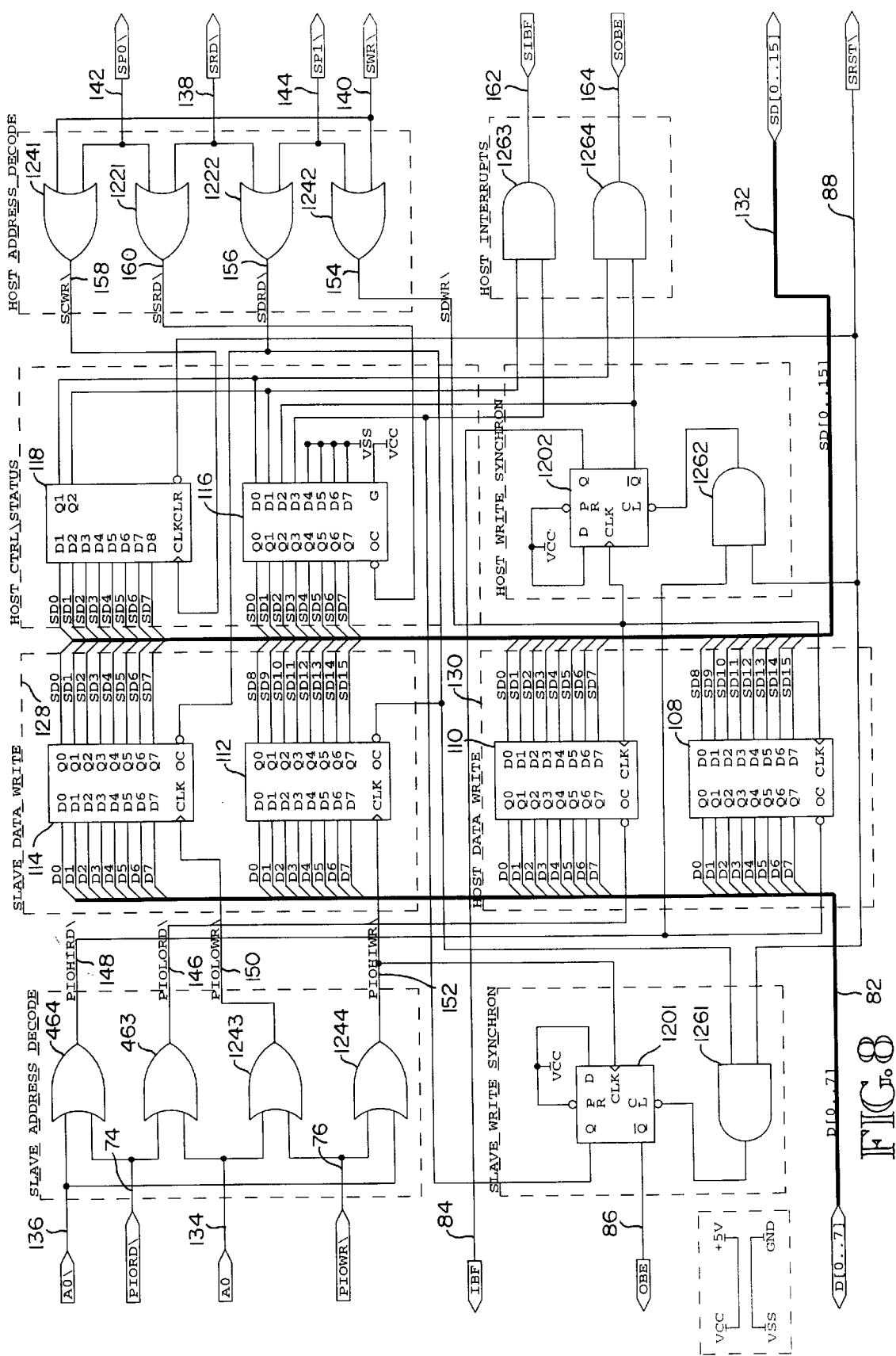
FIG. 8. is a schematic of the Programmed Input/Output circuit for the present invention.

Referring to FIG. 8, the PIO provides address decoding, data buffering and synchronization control between the SCU and HPI. It consists of four octal edge-triggered flip-flops 108–114, one octal D-type transparent latch 116, one octal D-type flip-flop with clear 118, two D-type positive-edge triggered flip-flops with preset and clear 1201–1202, eight 2-input positive-OR gates 463–464, 1221–1222 and 1241–1244, and four 2-input positive-AND gates 1261–1264.

Bidirectional data buffering is provided by flip-flops 108–114. Flip-flops 112–114 buffer 16-bit data from the SCU to HPI labeled Slave Data Write 128 and flip-flops 108–110 buffer 16-bit data from the HPI to the SCU labeled Host Data Write 130. This is accomplished by connecting the data inputs of flip-flops 112–114 (pins D0 through D7) and data outputs of flip-flops 108–110 (pins Q0 through Q7) to the 8-bit data bus of the microprocessor 38 labelled D[0 . . . 7] 82. Since the PIO presents a 16-bit Interface to the HPI and 8-bit Interface to the CPU, data must be sequentially written and read by the CPU in 8-bit transfers to each buffer.

Conversely, data paths between the PIO and BIU are accomplished by connecting the data outputs of flip-flops 112–114 (pins Q0 through Q7) and data inputs of flip-flops 108–110 (pins D0 through D7) to the host processor data bus 132 labelled SD[0 . . . 15]. Since both the PIO and HPI provide for 16-bit data transfers, data can be written and read in one cycle as opposed to the sequential requirement of the PIO-CPU Interface.

Address decoding within the PIO is performed for both the HPI and CPU using OR-gates 463–464, 1221–1222 and 1241–1244. CPU-PIO address decoding is performed using the inputs labelled PIORD\ 74, PIOWR\ 76, A0 134 and A0\ 136 from the CPU. BIU-PIO address decoding is performed using the inputs labelled SRD\ 138, SWR\ 140, SP0\ 142 and SP1\ 144 from the BIU.

Address decoding from the CPU to PIO must provide control signals for reading and writing both high 80 and low 78 data bits received from the CPU through data bus D[0 . . . 7] 82. These are referred to as PIOLORD\ 146, PIOHIRD\ 148, PIOLOWR\ 150 and PIOHIWR\ 152 and correspond, respectively, to the read and write-enable signals on flip-flops 110 and 118, and flip-flops 114 and 112, respectively.

PIOLORD\ 146 is generated through connections of PIORD\ 74 and A0 134 to an OR-gate 463 the output of which is connected to the output control pin OC of flip-flop 110. PIOHIRD\ 148 is generated through connections of PIORD\ 74 and A0\ 136 to an OR-gate 464, the output of which is connected to the output control pin OC of flip-flop 108. PIOLOWR\ 150 is generated through connections of PIOWR\ 76 and A0 134 to an OR-gate 1243 the output of which is connected to the input clock (CLK) of flip-flop 114. Finally, PIOHIWR\ 152 is generated through connections of PIOWR\ 76 and A0\ 136 to an OR-gate 1244, the output of which is connected to the input clock (CLK) of flip-flop 112.

HPI address decoding also requires four distinct signals corresponding to Host Data Write (SDWR\) 154, Host Data Read (SDRD\) 156, Host Control Write (SCWR\) 158 and Host Status Read (SSRD\) 160. Functions associated with SCWR\ 158 and SSRD\ 160 are discussed below under synchronization and are mentioned here only as address decoded signals.

SCWR\ 158 is generated through connections of SWR\ 140 and SP0\ 142 to an OR-gate 1241 the output of which is connected to the input clock (CLK) of flip-flop 118. SDWR\ 154 is generated through connections of SWR\ 140 and SP1\ 144 to an OR-gate 1242, the output of which is connected to the input clock (CLK) of flip-flips 108 and 110. SSRD\ 160 is generated through connections of SRD\ 138 and SP0\ 142 to an OR-gate 1221 the output of which is connected to the output control pin OC of transparent latch 116. SDRD\ 156 is generated through connections of SRD\ 138 and SP1\ 144 on an OR-gate 1222, the output of which is connected to the output control pin OC to flip-flops 112–114.

As mentioned earlier, the PIO provides important synchronization between the CPU and HPI via signals to each processor that data is available either for input or output. This is accomplished primarily through D-type positive-edge triggered flip-flops with preset and clear 1201–1202, one of which is dedicated to synchronizing data flows from the CPU to HPI 1201 and the other data flows from the HPI to CPU 1202.

CPU to HPI data flows are synchronized by flip-flop with preset and clear 1201 which records the state of the SCU output buffers 112–114 as to whether data has been written and read. This signal appears at the Q output of flip-flop with preset and clear 1201 and is a logic-high when the data buffer is full. Conversely, the inverted level of this signal appears at the Q\ output of flip-flop with preset and clear 1201 indicating to the SCU the output buffer is empty (labelled OBE) 86. When the SCU writes data to the 16-bit data buffer formed by flip-flops 112–114, the signal PIO-HIWR\ 152 clocks the flip-flop with preset and clear 1201 at the CLK input of causing the data value at the D input of the flip-flop with preset and clear 1201 (tied high to supply voltage +5V) to appear at the Q output. When the data is subsequently read by the HPI, the read signal SDRD\ 156 clears the buffer full state through its gated connection to the CL input of flip-flop with preset and clear 1201 through the output of positive-AND gate 1261. This positive-AND gate 1261 gates the signal with the system reset signal (SRST\) 88 in order to clear the data buffer full state upon either instance.

HPI to CPU data flows are synchronized by a flip-flop with preset and clear 1202 which records the state of the HPI output buffers as to whether data has been written and read. This signal appears on at the Q output of the flip-flop with preset and clear 1202 and is a logic-high when the data buffer is full (labelled IBF) 84. Conversely, the inverted level of this signal appears at the Q output of the flip-flop with preset and clear 1202 indicating to the HPI the output buffer is empty. When the HPI writes data to the 16-bit data buffer formed by flip-flops 108–110, the signal SDWR\ 154 clocks the flip-flop with preset and clear 120 at the CLK input causing the data value at the D input of (tied high to supply voltage +5V) to appear at the Q output. When the data is subsequently read by the SCU, the read signal PIOHIRD\ 148 clears the buffer-full state through its gated connection to positive-AND gate 1262. This positive-AND gate 1262 gates the signal with the system reset signal 88 in order to clear the data buffer full state upon either instance.

The connections of signals IBF 84 and OBE 86 have been described earlier under the CPU. Equivalent signals to the HPI, labelled SIBF 162 and SOBE 164, are gated to the BIU to allow for selective receipt of each signal. This is accomplished by data/control bits written by the host processor via the control signal SCWR\ 158 which causes the octal-latch at 118 to record the data values on the host processor's data bus 132. The control bit written to pin D1 at the octal-latch 118 will inhibit the SIBF 162 signal if written as a logic-low signal. Similarly, the control bit written to pin D2 at the octal-latch 118 will inhibit the SOBE 164 signal. This gating is performed by connection of pins Q2 and Q1 of the octal-latch 118 to the inputs of positive-AND gate 1264 along with the Q output of flip-flop with preset and clear 1201 and the Q\ output of flip-flop with preset and clear 1202.

Finally, the status of the data buffers may also be read from the transparent latch 116 by the host processor through the control signal SSRD\ 160 which causes the octal-latch at 116 to output its inputs onto the host processors data bus 132. Data inputs to the octal-latch 116 result from connections to pin D0 of the control bit written to pin D1 of the flip-flop with clear 118, pin D1 of the control bit written to pin D1 of the flip-flop with clear 118, and the data buffer status signals from the Q output of flip-flop with preset and clear 1201 and the Q\ output of flip-flop with preset and clear 1202 to pins D2 and D3, respectively, of the octal-latch 116. Unused input pins of the octal-latch 116 are tied to circuit ground thus always presenting logic-low signals to the host processor when read.

Bus Interface Unit

Figure 9:
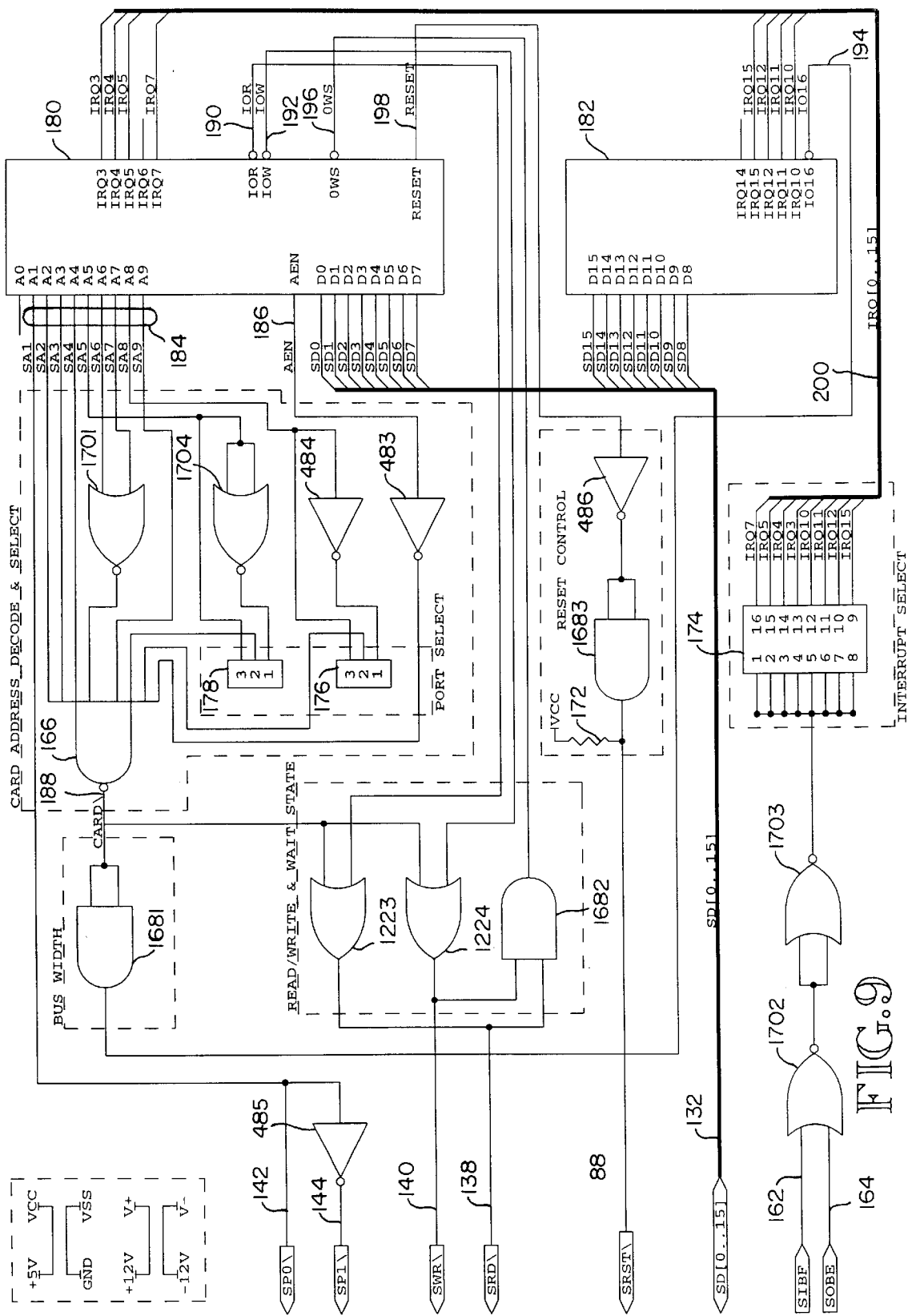
FIG. 9. is a schematic of the Bus Interface Unit circuit for the present invention.

Referring to FIG. 9, the BIU is responsible for decoding address and control signals issued by the host processor and channeling data from the PIO onto or off of the host data bus 132. It also provides reset 88 and startup signals to the entire circuit in order to maintain synchronization and initialization between the SCU and HPI. Finally, the BIU channels PIO outputs SIBF 162 and SOBE 164 onto the interrupt lines 200 of the host processor. As described herein, the BIU is initially implemented for the PC/AT, but provides host independent signals to the PIO allowing for implementations on different host systems without the need for changes to the rest of the circuit.

The BIU consists of one 8-input positive-NAND gate 166, three 2-input positive-AND gates with open-collector outputs 1681–1683, four hex inverters 483–486, two 2-input positive-OR gates 1223–1224, four 2-input positive-NOR gates 1701–1704, resistor 172 and jumpers 174–178. Edge card connectors 180–182 provide connection to the host processor system bus.

Address decoding is provided by the positive-NAND gate 166, hex inverters 483–486, positive-NOR gates 1701–1704 and jumpers 176–178 which collectively allow jumper-selectable decoding of host addresses $33C, $31C, $23C or $21C. This is accomplished principally by the positive-NAND gate 166 which has its inputs connected to the host address bus lines SA1 through SA9 184. Address lines SA1 through SA4 are connected directly, with SA6 and SA7 first gated through positive-NOR gate 1701, the output of which is connected to positive-NAND gate 166. This gate will issue a logic-low signal if either SA6 or SA7 is a logic-high signal.

SA5 is connected to the positive-NAND gate 166 through jumper 176 which connects either the nominal SA5 signal or its inverted value from positive-NOR gate 1704. This selectable signal level determines which host address ($?3C or $?1C) the circuit will respond to. SA8 is connected to the the positive-NAND gate 166 through jumper 178 which connects either the nominal SA8 signal or its inverted value from hex inverter 485. This selectable signal level determines which host address ($3?C or $2?C) the circuit will respond to. Two other signals, SA9 and the inverted signal of Address Enable (AEN) 186 through hex inverter 483 from the host address/control bus, are connected to the positive-NAND gate 166 inputs which must be logic-high to enable the circuit.

The output of the positive-NAND gate 166, labelled CARD\ 188, indicates whether the host processor is addressing the circuit if this output is a logic-low. However, since the PC/AT provides both an external memory address space and input/output address space, this signal must be further gated against host processor input/output control signals to determine if the circuit is being addressed as an input signal labelled SRD\ 138 or output signal labelled SWR\ 140 versus a memory device.

Input/output decoding requires the active-low CARD\ 188 signal to be logically ORed against both the host processor's Input/Output Read signal (IOR\) 190 and Input/Output Write signal (IOW\) 192 through positive-OR gates 1223–1224, respectively. Positive-OR gate 1223 provides this function for IOR\ 190 by connecting its inputs to CARD\ 188 and IOR\ 190. The output from positive-OR gate 1223 will be active-low if the card is being read from the host processor and is connected to the PIO for further address decoding. The IOW\ 192 host signal is similarly gated through positive-OR gate 1224 which has as is inputs IOW\ 192 and CARD\ 188. The active-low output from this gate is also connected to the PIO for further address decoding.

In order to operate properly with the PC/AT system bus, two other signals must be generated from the foregoing address decoding activities within a specified amount of time and are signals 1016 194 and 0WS 196. IO16 194 indicates to the host processor that the input/output device is capable of 16-bit data transfers and is generated from the CARD\ 188 signal gated through positive-AND gate with open-collector output 1681, which changes the totem-pole output from the positive-NAND gate 166 to open-collector output for the PC/AT control bus.

The other required signal, (0WS) 196, indicates to the host processor the circuit addressed is capable of zero wait-state operation and is generated by logically ANDing the outputs from positive-OR gates 1223–1224 through positive-AND gate with open-collector output 1682. This open-collector signal is active-low if the Controller is being addressed and either IOR\ 190 or IOW\ 192 is active.

To complete the discussion on address decoding, the PIO requires the appropriate address signal indicating either a data or status/control transfer. This signal is provided by outputting from the BIU to the PIO system address line SA1 both in its nominal state and inverted state (through hex inverter 485).

The BIU is also responsible for providing system reset synchronization to the circuit. This is accomplished through hex inverter 486, resistor 172 and positive-AND gate with open-collector output 1683. The system reset signal (RESET) 198, is active-high and must be inverted through hex inverter 486 and converted to an open-collector signal by 1683 for use by the circuit. When this inverted signal becomes active-low, it resets the microprocessor 38 and clears the PIO output buffer full status for both the SCU and HPI.

Finally, efficient data transfers between the host processor and circuit are accomplished through the use of switch selectable interrupts. The PIO signals SIBF 162 and SOBE 164, having been logically ANDed with interrupt inhibit control bits written to the PIO, will be active-high if either state is true. These two signals are logically ORed through two NOR gates 1702–1703, the output from which is connected to a eight-position jumper 174. This jumper allows for one (or none) of up to eight different interrupt signals to the host to be chosen. The active-high signal selected is then asserted on the appropriate interrupt control line to the host processor through edge connectors 180–182.

Miscellaneous

Decoupling of circuit ground and power improves noise immunity and protects against voltage transients, and is accomplished through the use of decoupling capacitors. Since the use of decoupling capacitors is considered good digital design, is well-known and does not affect the functionality of the circuit, they are not discussed in detail.

Firmware Description

The Interface is implemented within the preferred embodiment as firmware consisting of three main program segments: 1) main processing; 2) command execution; and 3) interrupt event processing. Collectively, these three segments facilitate the input, translation and subsequent output of modified digitizer coordinates within the framework of the Interface.

Main Processing

Figure 10:
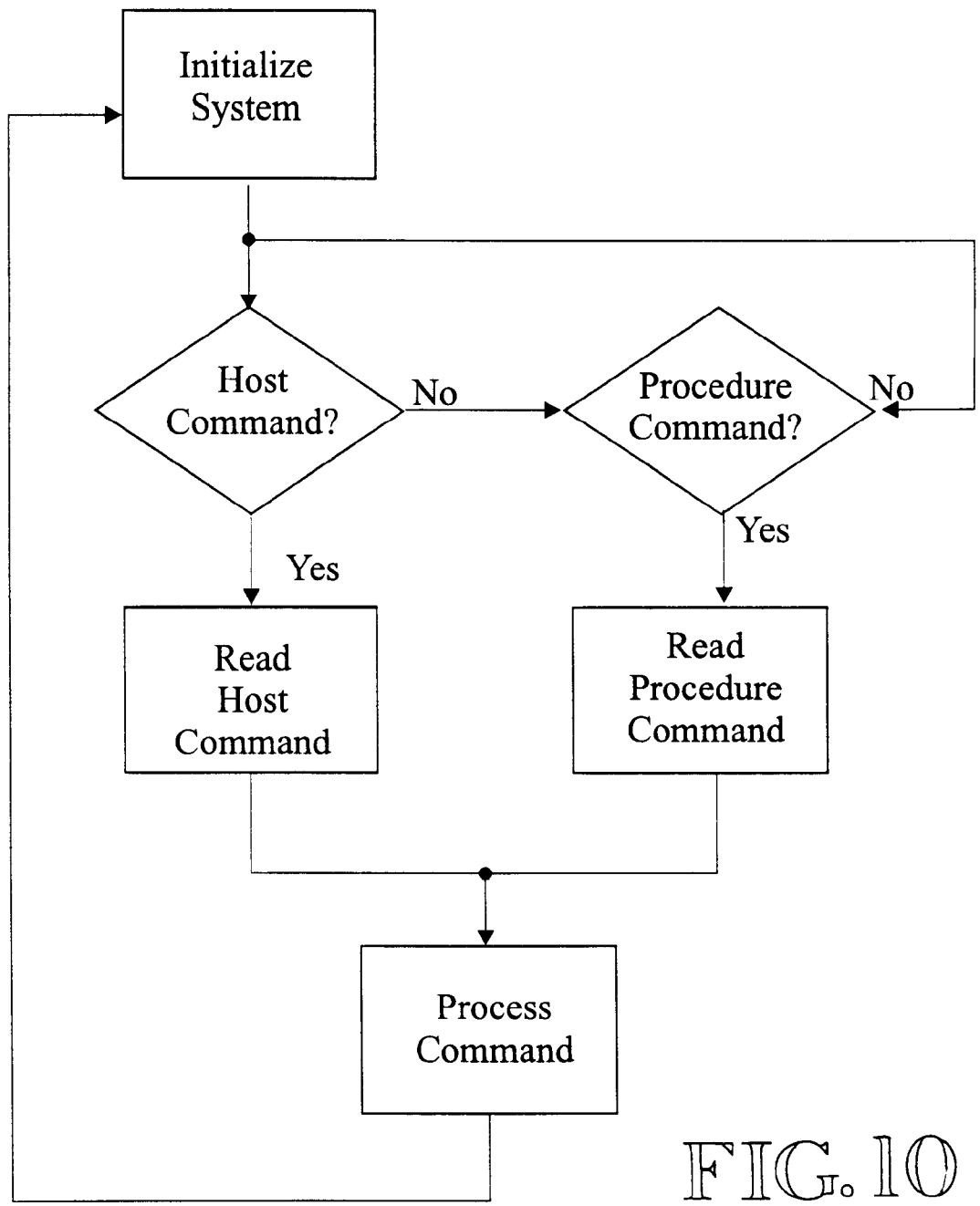
FIG. 10. is a flowchart depicting the main program loop of the present invention.

Referring to FIG. 10, the main processing loop is entered upon power-tip to the microprocessor circuit or execution of a RESET DEVICE command. This loop is responsible for initializing the Circuit and Interface to a known starting state and thereafter for dispatching commands to the Command Execution Unit ("CEU").

Circuit initialization is largely dependent on the particular circuit and generally involves configuring internal microprocessor registers having to do with interrupts and input-output port assignments as well as performing any Power-on Self-Tests ("POST") involving the processor, memory, communications circuits and Host Processor Interface. Initializing the Interface involves allocating initial memory data structures, examining the results of the POST and transmitting these results to the host processor.

Upon satisfactory system initialization, the main processing loop then enters into a command dispatching loop which polls both the host processor interface and the Procedure queue for any commands awaiting execution. It remains in this command dispatching loop until power is removed from the Circuit or the execution of a RESET DEVICE command.

Command dispatching is accomplished by polling the HPI for receipt of a valid command. If such a command is available, it is read from the HPI, dispatched to the CEU and the polling process continued. The CEU is detailed in FIG. 11 and will be discussed subsequently.

Alternatively, if a command from the HPI is not available, the procedure queue is polled for any commands awaiting execution. This queue is filled from the activation of Stored Procedures which in turn are selected by a valid event within a region for which a Stored Procedure has been defined. The actual steps for filling this queue are discussed subsequently under "Event Processing" and the steps involved in creating Stored Procedures are discussed below under "Command Execution."

If a procedure command is available for execution, it is read from the procedure queue and dispatched to the CEU. Thereafter, the main processing loop is again entered and commences with polling the HPI for an available command.

Command Execution

Figure 11:
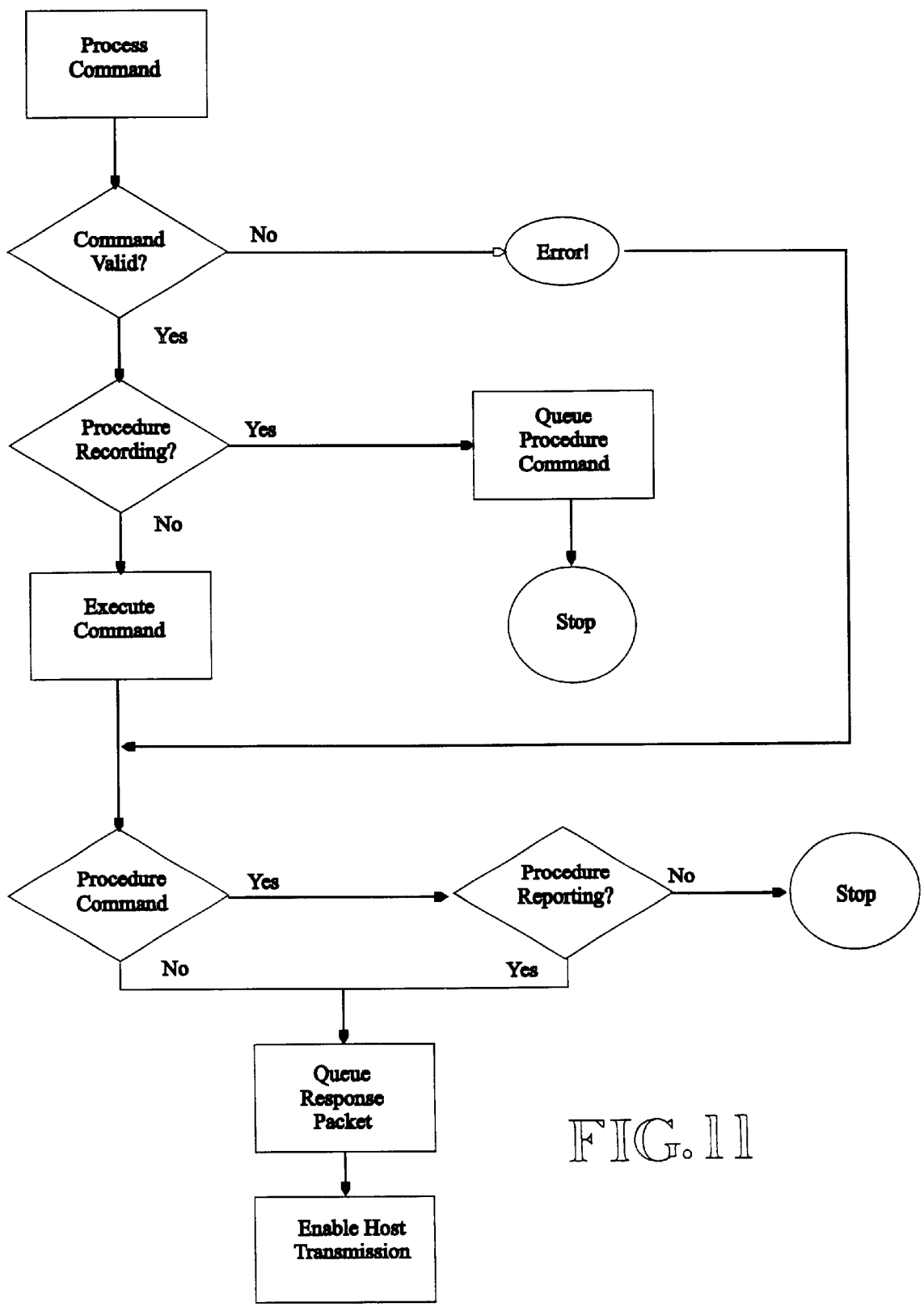
FIG. 11. is a flowchart depicting command execution unit of the present invention.

Referring to FIG. 11, the Command Execution Unit is responsible for executing Interface commands received either from the HPI or the procedure queue. During such execution, it makes no differentiation as to the source of the command thereby enabling the entire command set be stored and executed within a Stored Procedure.

The CEU first validates the command by checking the command identifier in the first packet word and whether the requisite number of arguments are present. It also verifies whether a given command is valid within the current context, e.g. opening a region before the tablet or device layers have been initialized. Invalid commands result in an error which is subsequently returned to the host processor without any further execution.

Upon receipt of a valid command, the CEU then checks whether a Stored Procedure is in the process of being created having been done so by the previous receipt of an OPEN PROCEDURE command. If such procedure recording is enabled, the command and its arguments are copied to the currently defined Stored Procedure without execution and the CEU loop terminated.

If a Stored Procedure is not currently being defined, the command along with its arguments is executed and the error result recorded for transmission back to the host processor as a response packet (see "Packet Protocols").

Upon completion of the individual command execution, the CEU tests whether the command was received from the HPI or the procedure queue. If it is a procedure command and procedure reporting has not been enabled (through the prior receipt of an ENABLE PROCEDURE REPORTING command) the CEU loop is terminated.

If the command is not from a procedure or procedure reporting is enabled, the CEU then queues the response packet containing the result of the command as a response packet and then enables its transmission to the host processor before terminating.

It is important to note that response packets and event packets are queued together for transmission to the host processor in order to synchronize the data transfer rates of both the circuit and host processor. This transmission is accomplished under interrupt control from the PIO through the BIU (see "Circuit Description") and must be specifically enabled in the event that packets are awaiting delivery to the host processor.

Event Processing

Figure 12:
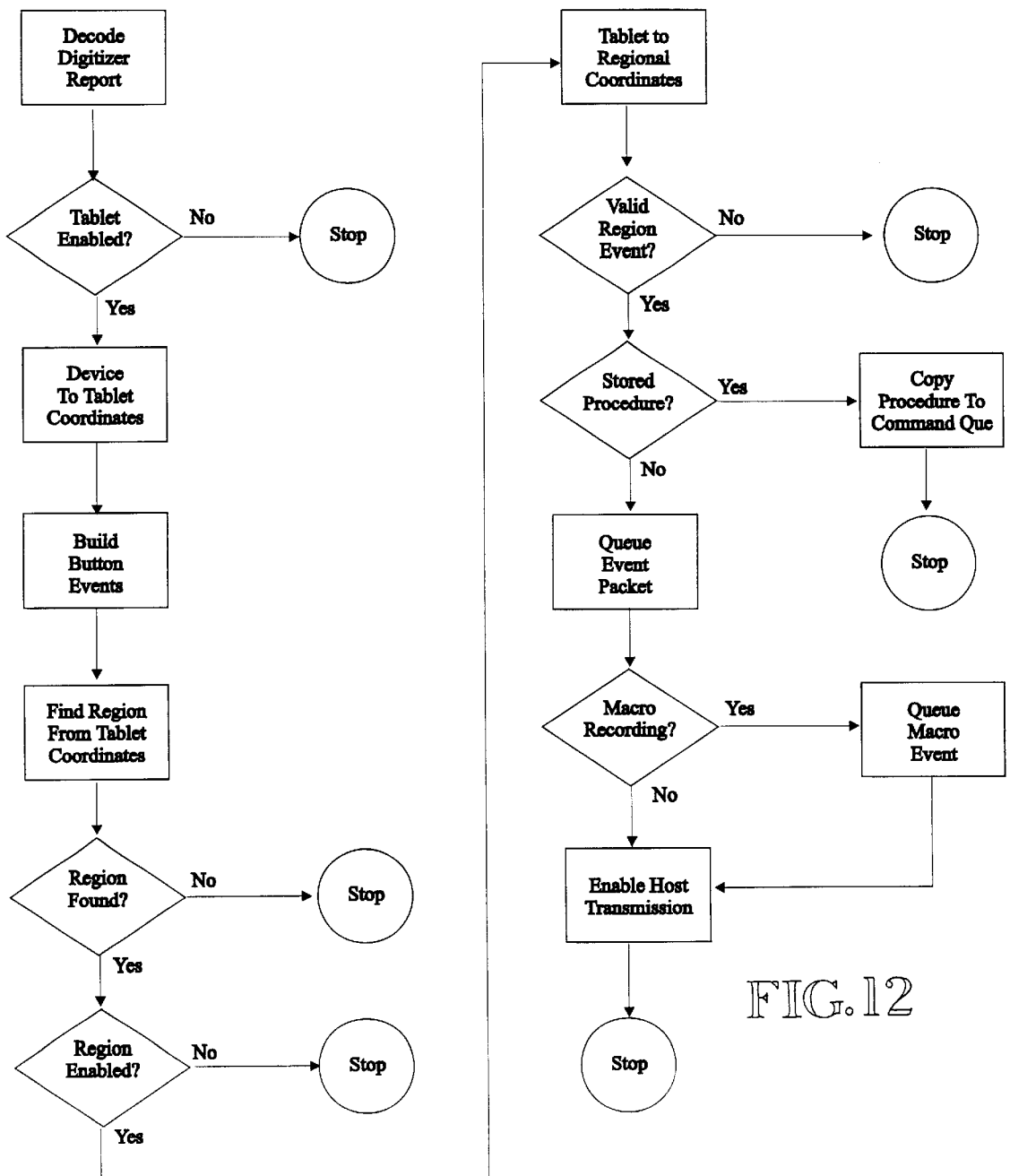
FIG. 12. is a flowchart depicting interrupt event processing of the present invention.

Referring to FIG. 12, the event processing loop is entered asynchronously on an interrupt basis upon receipt of a valid digitizer report through the SIO circuit. The loop begins by assembling a valid digitizer report from the stream of character data in a format specific to the device previously specified in the OPEN DEVICE command.

Upon receipt of the digitizer report, it is translated into a common, internal format which includes the X and Y device coordinates as 16-bit two's complement integers in addition to a 16-bit word in which individual button states are represented by a logical-one bit (thereby providing up to 16 different button states to be recorded). Then, if multiple logical tablets have been assigned to the device, these coordinates are used to determine in which logical tablet the coordinate lies by use of a simple look-up table which then selects the appropriate tablet configuration for further processing.

The device coordinates are then scaled to the tablet coordinate system (previously specified through the SET TABLET EXTENTS command) by the application of the following equations:

$$x\text{TABLET} = (x\text{DEVICE} * x\text{EXTENT}) / x\text{DEVICEEXTENT}$$

$$y\text{TABLET} = (y\text{DEVICE} * y\text{EXTENT}) / y\text{DEVICEEXTENT}$$

where XTABLET and YTABLET are the X and Y tablet coordinates, XDEVICE and YDEVICE are the X and Y device coordinates, XEXTENT and YEXTENT are the tablet coordinate system extents as defined previously with the SET TABLET EXTENTS command and XDEVICEEXTENT and YDEVICEEXTENT are the device extents specific to the actual digitizer.

The button states are then modified to reflect the release of buttons since few digitizers report this information directly. These button states are calculated using boolean algebra according the following equations:

$$w\text{DOWN} = w\text{EVENT XOR } w\text{LAST}$$

$$w\text{UP} = (w\text{EVENT XOR } w\text{LAST}) \text{ AND } w\text{LAST}$$

$$w\text{EVENT} = w\text{DOWN OR } (w\text{UP} << 1)$$

where wDOWN is the bit-mask for button presses, wUP the bit-mask for button releases, wEVENT is the button states derived from the digitizer report and wLAST is the button states derived from the previous report.

Once the device coordinates have been translated into the tablet coordinate system, the tablet coordinates are used to locate the region to which, if any, the coordinates apply. This is commonly referred to as "hit-testing" for which many different methods may be used.

In the preferred embodiment, the method chosen utilizes a hybrid of two such methods involving both a hash-table and sequential list search. The hash-table is a two dimensional array of lists each of which contains an array of regions. Indices for this table are implementation dependent and are chosen as the value sixteen in each dimension which represents a compromise between available memory, processing speed and the maximum number of regions supported.

The hash-table is indexed by using the four most-significant-bits of the X and Y tablet coordinates which collectively narrow the field of search to 1 of 256 possible areas of the tablet in which to begin. Once this is accomplished, the list of regions whose bounds intersect this area are then searched sequentially to determine if the tablet coordinate lies within each region. If a region corresponding to the tablet coordinate is found, the search is halted, otherwise the event processing loop will be terminated.

It should be noted that the hash-table entries are maintained during, execution of several region commands including OPEN REGION, CLOSE REGION and MOVE REGION. Also, since events can only be generated from within regions, failure to locate a region corresponding to a particular tablet coordinate necessarily suspends further processing of the digitizer report.

Provided a region is found, a flag indicating whether the region is enabled is then tested and the event processing terminated if not. This flag is modified by execution of the ENABLE REGION and DISABLE REGION commands.

Upon location of an enabled region corresponding to the tablet coordinates, the tablet coordinates are then translated into the region's coordinate system which has been defined by the commands SET REGION EXTENTS or SET REGION RESOLUTION, SET REGION ORIGIN and SET REGION ROTATION. This translation is accomplished by the following of equations:

$$X' = (((X - x\text{LEFT}) * x\text{EXT}) / (x\text{RIGHT} - x\text{LEFT})) - x\text{ORG}$$

$$Y' = (((Y - y\text{LOW}) * y\text{EXT}) / (y\text{HIGH} - y\text{LOW})) - y\text{ORG}$$

$$X''=(X'''*\cos(\text{ANGLE}))+(Y'''*\sin(\text{ANGLE}))$$
$$Y''=(X'''*\cos(\text{ANGLE}))+(X'''*\sin(\text{ANGLE}))$$

where X' and Y' equal the region coordinates prior to rotation, X" and Y" equal the region coordinates after rotation, X and Y equal the tablet coordinates, xLEFT and xRIGHT equal the horizontal bounds of the region in tablet coordinates, yLOW and yHIGH equal vertical bounds of the region in tablet coordinates, xEXT and yEXT equal the region extents as specified through the SET REGION EXTENTS command, xORG and yORG equal the region origin in regional coordinates as specified through the SET REGION ORIGIN command and ANGLE equals the rotation factor in degrees as specified through the SET REGION ROTATION command.

Once the tablet coordinate has been translated into the region's coordinate system, the events for the digitizer report are updated to reflect whether the coordinate has changed from the prior report. This is done by comparing the regional coordinate with one saved from the prior report and setting a bit in the current event mask.

At this point in the event processing, the report has been fully translated: first into tablet coordinates, then into regional coordinates and finally the button states for the report decoded. These event bits are then compared against an event mask for the region (which has been defined with the SET REGION MASK) by performing a logical AND operation of the digitizer events with the region event mask. If the result of this test is zero, then the digitizer events do not correspond to any specified for the particular region and the event processing loop is terminated.

The region is then examined to determine whether it contains a Stored Procedure. If one exists, it is copied to the procedure queue for dispatching by the main processing loop and subsequent execution by the CEU. The event processing loop is then terminated as Stored Procedures are defined as not generating events on their own.

Should a Stored Procedure not be defined for the region, an event packet is queued for delivery o the host processor which contains the X and Y coordinates (if so requested and present) as well as the region address and event bits. The precise format of this packet is detailed under "Packet Protocols" and ay be either two or four words long depending on the presence of coordinate data.

After the event packet has been queued for delivery to the host processor, a flag is checked indicating whether macro recording is enabled. This flag is set or cleared upon execution of the OPEN MACRO and END MACRO commands, respectively. If macro recording is enabled, then the same event packet is also copied to the current macro queue which can then be replayed upon execution of the PLAY MACRO command.

Finally, host transmission is enabled (if not already so) in order to begin transfer of the packet queue data to the host processor. It should be noted that this transmission is enabled upon each receipt of a valid packet whether such packet is generated as an event packet or response packet (see "Command Execution").

Application Example

In order to illustrate the use of the Interface and Circuit, an example application is provided which demonstrates four elements of the Interface: tablet and regional coordinate systems, template regions, Stored procedures and macros.

Figure 13:
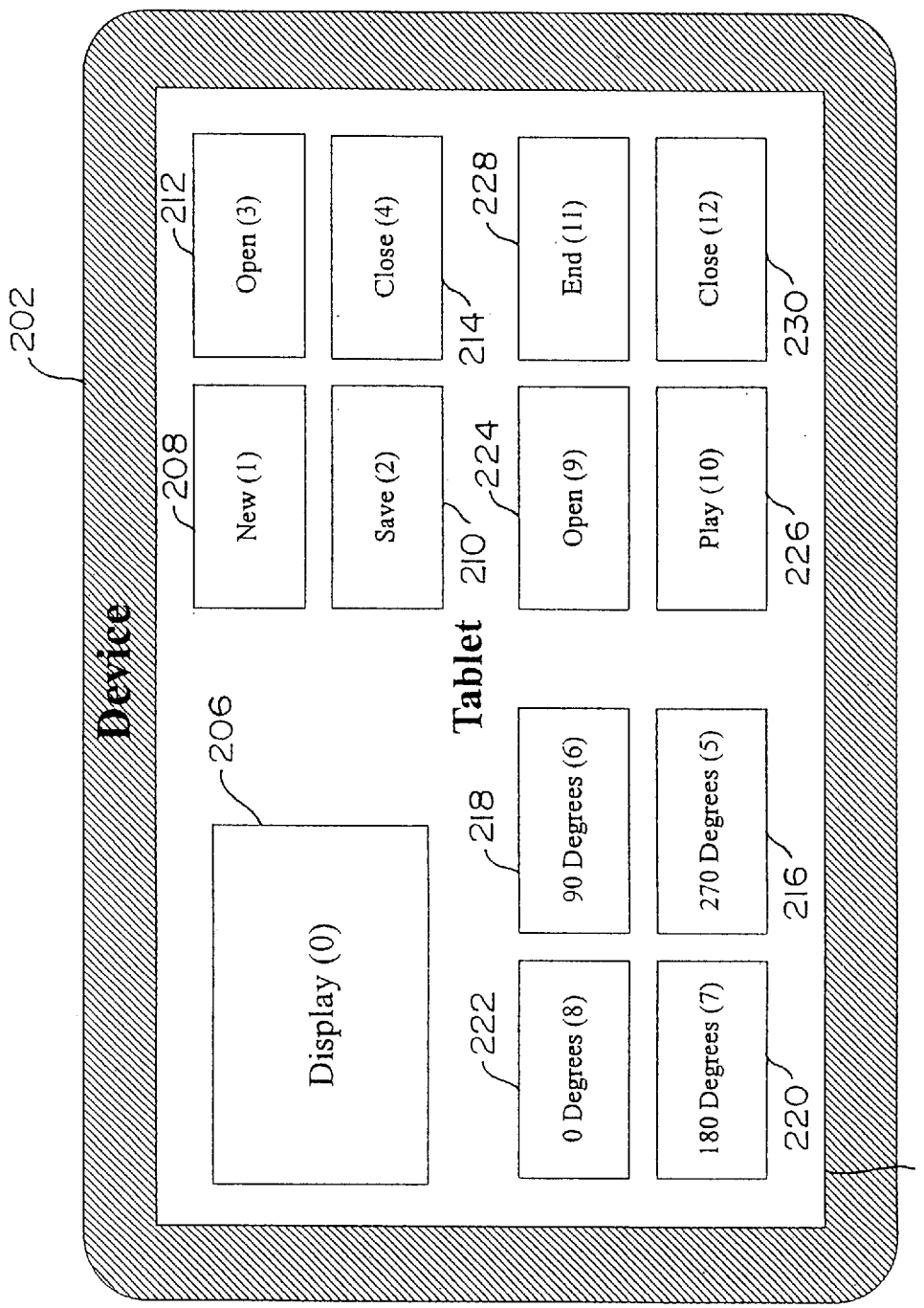
FIG. 13. illustrates an example template menuing system created with present invention.

The example template is shown in FIG. 13 as it would appear if produced on paper (albeit reduced in size) and placed on the surface of the example digitizer. The device area 202 is labeled and shown as shaded in gray. The tablet area 204 (also known as the Active Area) is labeled and enclosed within the device area 202. Finally, thirteen regions 206–230 are labeled as shaded rectangles with text describing their intended function along with the region's number in parentheses.

Overview

Region (0) titled "Display" 206 will be designated as a drawing region, or a region with a local coordinate system that will output events consisting of button states, X and Y coordinates. Events from this region will be used to move a hypothetical cursor on the system display of the host processor.

Regions (1), "New," through (4), "Close," 208–214 will be defined as template or menu regions and as such will not contain local coordinate systems. Instead, they will output events consisting of button states and address information only. These regions are intended to demonstrate menu selections typically associated with computer applications that create, open, save and close document files and are often represented in a "File" menu option within an application's main menu.

Regions (5), "270 Degrees," through (8), "0 Degrees," 216–222 will illustrate the use of Stored Procedures to manipulate the coordinate system of the drawing or display Region (0) 206. These regions will do so by selectively allowing the drawing regions coordinate system 206 to be rotated between 0 and 270 degrees depending on which of Region (5) through Region (8) 216–222 are activated.

Finally, Region (9), "Open," through Region 12, "Close," 224–230 will illustrate the macro recording and playback capabilities of the Interface through the use of Stored Procedures. In addition, the Stored Procedures used to accomplish this will demonstrate one aspect of controlling the Interface by selectively enabling and disabling certain regions thereby inhibiting unintentional activation.

The complete listing of the example device's attributes, defined tablet coordinate system and each region can be found in Listing 1 below. The example device chosen measures 18.000 and 12.000 inches with a maximum resolution in each axis of 1270 counts per inch. It is important to note that the specific device attributes are irrelevant since the Interface commands will execute unmodified for any digitizer which employs the Interface.

The tablet layer 204, or virtual tablet coordinate system, is scaled to an arbitrary size of 10,000 counts in each. Once specified this way, each region created will be defined within the tablet coordinate system with bounds between 0 and 10,000. Again, it should be noted that the tablet layer provides true device virtualization since Interface commands and their operation are directed at the tablet layer which translates device coordinates into the tablet coordinate system defined at time of execution.

Region (0), or the display region, 206 will be created within the tablet coordinate system bounded by the rectangle (292, 5841, 4449, 9583), or lower-left and upper-right, respectively. It will be assigned a local coordinate system with extents of 1,000 in each axis, an origin at (500, 500) and initially no rotation thereby yielding regional coordinates in the X and Y axis between −500 to +500. This region will be activated by the press or release of any button and output X and Y coordinates relative to the last reported position.

Region (1) through Region (4) 208–214 will be created similarly within the tablet coordinate system (see Listing 1 for the specific bounding areas of each) but will not output coordinate data and therefore are defined with event masks comprising only the release of button 1. Since these regions will constitute file menu selections for a host processor application, coordinate data is not required and events from these regions will contain only the event bits satisfied (button 1 up) and the region address. Further to the example, each region is assigned character keystrokes necessary to activate the requisite command within the hypothetical application which could simulate the actual commands as typed from a keyboard on the host processor.

Region (5) through Region (8) 216–222 will be created within the tablet coordinate system (see Listing 1 for the specific bounding areas of each) but will neither output coordinate data nor events. Instead, each will be assigned a Stored Procedure consisting of a series of Interface commands which will be executed upon activation of the specific region (in this case the release of button 1). These regions collectively Will modify the rotation of the regional coordinate system in Region (0) 206 thereby producing rotational effects when Region (0) 206 outputs coordinate data to the host processor for drawing on the screen.

Each Stored Procedure in Region (5) through Region (8) 216–222 consists of simply one Interface command to change the Region (0) 206 coordinate rotation: the rotation factor for which is specific to each of Region (5) through Region (8) 216–222. In this regard, Region (5) 216 will set the rotation to 270 degrees counter-clockwise, Region (6) 218 the rotation to 90 degrees, Region (7) 220 the rotation to 180 degrees and Region (8) 222 to zero degrees, or no rotation at all. Note that while each region's rotation value is different (see listing 1 for each region under the Procedure heading and Argument 1 columns), the address of each command is always Region (0) 206.

Finally, Region (9) though Region (12) 224–230, created within the tablet coordinate system (see Listing 1 for the specific bounding areas of each) also demonstrate the use of Stored Procedures but with the intended effect of beginning, editing, playing and closing a stored sequence of event packets which in this example are generated only from Region (0) through Region (4) 206–214. As such, the are not defined in terms of a local or regional coordinate system, but execute their Stored Procedures upon activation or the release of button 1, i.e. per their defined event masks.

While each of the various regions are grouped for completeness, Region (9) through Region (12) 224–230 are grouped together (Region Group 3) specifically in order to benefit from the use of region group addresses in executing their Interface commands. Each Stored Procedure will first disable Region Group 3, or all the macro regions 224–230, before re-enabling specific regions in order to maintain the syntax of the Interface. This means, for example, that before a macro can be replayed it must be opened and ended. Therefore, the region which replays a macro, Region (10) 226, is disabled until the macro is both opened and ended. The use of region group addressing, while not necessary, facilitates context-dependent relationships in addition to increasing execution speed and lowering code size.

Region (9), "Open," 224 will open a macro upon its activation by first disabling the all the regions in Region Group 3, Region (9) through Region (12) 224–230, then re-enabling Region (11), "End," 228 and finally executing the Interface command OPEN MACRO. Upon execution of this Stored Procedure, Region (9) 224, Region (10) 226 and Region (12) 230 will be disabled and the Interface will be collecting and saving event packets in a macro queue for later playback.

Region (11), "End," 228 performs a similar function, leaving Region (10), "Play," 222 and Region (12), "Close," 230 enabled before ending the macro recording. At this point, the macro is recorded and ready for playback or can be closed and a new one opened.

Region (10), "Play," 226 does not need to control the activation of the other regions in its group by virtue of its command context. Therefore, it simply executes the Interface command PLAY MACRO to copy the stored event packets from Region (0) through Region (4) 206–214 to the Interface's packet output queue for delivery to the host processor.

Finally, Region (12), "Close," 230 is responsible for closing the macro queue and as such disables all the macro regions 224–230 except Region (9) 224. This allows a new macro to be recorded without context-dependent errors such as ending, playing or closing a macro which has been previously closed.

Commands

The specific Interface commands and their arguments necessary to implement this example template may be found in Listing 2 below which contains three major sections: Prolog, Region and Stored Procedure definitions, and an Epilog. Each of these sections (specified for clarification only) lists the command codes and their arguments in hexadecimal notation along with a textual command description. Column 1 is a code address counter for reference purposes only and it not part of the command set. Columns 2 though 7 list the sixteen-bit words comprising the Interface command, its address and arguments 1 through 4, if any.

The Prolog commands, in this example, prepare the Interface to accept commands for creating regions by first closing the tablet layer (CLOSE TABLET) and removing any outstanding packets (FLUSH DEVICE). It then opens the tablet layer (OPEN TABLET) and scales the tablet coordinate system to X and Y extents of 10,000 (SET TABLET EXTENTS) within which each region will be defined.

Following the Prolog, each region (and Stored Procedure for that region, if defined) is created by first executing the OPEN REGION command with the region's address and bounding tablet coordinates. Then, as in the case of Region (0) 206, if a local coordinate system is to be used, it is further defined in terms of its extents or resolution, origin and rotation. Since only one region in this example is designed to output coordinate data, Region (0) 206, commands to establish the regional coordinate system need only be executed for that region.

Region creation commands then execute the SET REGION GROUP command for each logical grouping of regions which later facilitates their manipulation as single entities using region group addressing. As stated earlier, this is not always necessary but facilitates region manipulation in the macro regions, (Region (9) through Region (12) 224–230, in this example.

After each region is opened, a Stored Procedure for that region, if defined, is then created by the enclosing the Stored Procedure commands with the Interface commands OPEN PROCEDURE and END PROCEDURE. This instructs the Command Execution Unit not to execute the commands immediately but store them within the region for later execution. The relevant Interface commands for the Stored Procedure in each region are then specified and are dependent on the intended action of each region.

Finally, the Epilog section sets the region mask for each region using the region group addresses with the SET REGION MASK command for each of the four region groups created. The event mask for Region Group 0, Region (0) 206, is set to any button pressed or released and relative coordinates. The region mask for all other regions is set to the release of button 1 only. The epilog section concludes by enabling each region group with the ENABLE REGION command before enabling the tablet with the ENABLE TABLET command.

At the conclusion of the Epilog, it should be noted that the tablet layer and has been opened and initialized, thirteen regions and eight Stored Procedures have been created, region masks are set, and regions are enabled before the tablet layer is finally enabled. This permits the Interface to begin generating event packets or executing Stored Procedures upon the user-actions defined for each relevant region.

Packets awaiting delivery to the host processor at this point, providing no errors have occurred, consist of command acknowledgement packets for each command executed. For example, from the Prolog section of the code, there would be acknowledgement packets of two words each for the CLOSE TABLET, FLUSH DEVICE, OPEN TABLET and SET TABLET EXTENTS commands. (Note that the CLOSE TABLET command may contain an error code if the tablet was already closed from a prior application.)

Similarly, acknowledgement packets will be queued and awaiting delivery to the host processor for each region command. For example, the Region (0) 206 command acknowledgement packets would consist of three, two-word packets for the OPEN REGION, SET REGION EXTENTS and SET REGION ORIGIN commands. Regions for which Stored Procedures are defined would contains the OPEN PROCEDURE and END PROCEDURE acknowledgement packets, but the actual Interface commands in each procedure would not be executed nor results returned to the host processor.

Finally, acknowledgement packets from the Epilog section of commands would contain acknowledgments from the commands SET REGION MASK and ENABLE REGION for each region group, and the ENABLE TABLET command. Since packets are queued within the Interface on a first-in, first-out basis, the command acknowledgement packets would be delivered prior to any event packets (provided the ENABLE REGION and ENABLE TABLET commands were the last executed).

It should be noted that the entire example template presented consists of 71 Interface commands comprising 220 16-bit words. These commands will create the desired template menuing system for any digitizer that supports the Interface regardless of digitizer type or host processor system. Furthermore, the information received from the Interface will consist only of that information requested with translation of the digitized points to specific menu areas and coordinate values. This significantly reduces the amount of host processor computing resulting in both higher system throughput and faster application response time.

Sample Events

In order to demonstrate the flow of events within the sample application template, four event scenarios will be examined: region coordinate translations, Region (0) 206, template command translations, Region (1) through Region (4) 208–214, execution of Stored Procedures, Region (5) through Region (8) 216–222 and recording and playback of macro event sequences, Region (9) through Region (12) 224–230.

Referring to the sample template illustrated in FIG. 13, the object definitions in Listing 1, the Stored Procedure commands in Listing 2 and the block flowchart diagrams of FIGS. 10, 11 and 12, the first sample event scenario consists of processing coordinate events from Region (0) 206 (defined as a drawing region with a local coordinate system for moving a cursor on the host processor display).

Assuming the user presses or releases a button or moves a cursor or stylus within the Region (0) 206 of the digitizer surface, event packets will be generated containing both the buttons' states and X and Y coordinates in the region coordinate system. The packets will originate from the actual digitizer device reports, will be found to lie within Region (0) 206 boundaries on the tablet coordinate system, and will be scaled and translated to the regional coordinate system.

Since the event mask for Region (0) 206 specifies any button event or coordinate change as a valid event, event packets originating from this region will consist of four packet words thereby providing the host system with a location for the system display cursor or which one or more button events occurred.

Now assume the user moves the cursor over the digitizer surface until it is positioned over one of Region (1) through Region (4) 208–214. Since the event masks for these regions specify only the release of button 1 as a valid event, no event packets are generated as a result of this movement. Instead, the user must release button 1 while over any of Region (1) through Region (4) 208–214. Doing so will generate an event packet for that region consisting only of the event word and the region address.

For example, if button 1 is released over Region (3) 212, an event packet would be generated in which the first packet word contains the bits set for the release of button 1 (bit position 1) and the second packet word contains the region address number 3. The receipt of this packet would inform the host processor application (with suitable fore knowledge) that the file menu operation to open a file had been selected.

Now also assume the user moves the cursor across the digitizer device surface until it is positioned over Region (6) 218 and releases button 1. This will not generate an event packet but instead executes the Stored Procedure for that region which in this case sets the rotation for the Region (0) 206 coordinate system to 90 degrees. Thereafter, until changed again, all coordinate data generated from Region (0) 206 will be rotated counter-clockwise by 90 degrees.

Again, as in the scenario described for Region (3) 212, no event packets are generated, or in this case the Stored Procedure executed, due to movement of the cursor but only upon the release of button 1. Execution of the Stored Procedure, it should noted, consists of copying, the Interface commands for that Stored Procedure to the Procedure Command Queue which will be dispatched by the Main Program Loop to the Command Execution Unit.

Finally, assume the user moves the cursor across the digitizer device surface and positions it over Region (9) 224 before releasing button 1. This will activate the region resulting in execution of its Stored Procedure to open a macro for recording. As noted earlier, this Stored Procedure will also leave Region (9) 224, Region (10) 226, and Region (12) 230 disabled and Region (11) 228 enabled.

Once macro recording has begin, any further event packets from Region (0) through Region (4) 206–214 will be saved in a queue (and transmitted to the host processor) until the macro is ended—releasing button 1 over Region (11) 228. Upon satisfaction of this scenario, any recorded event packets could be replayed by copying them to the packet output queue by execution of the PLAY MACRO command activated by the release of button 1 while the cursor is positioned over Region (10) 226.

BENEFIT SUMMARY

The preceding sample application illustrates some of the benefits of the interface as summarized below:

The commands necessary to create the sample template were easily produced to yield a powerful template menuing system that is digitizer and host processor independent;

The ability to define a local, regional coordinate system facilitated using a drawing region without requiring any specialized programming knowledge or device specific attributes;

Translation of specific areas of the digitizing surface into template menu commands is accomplished easily without the intervention of the host processor;

The use of Stored Procedures allows complex coordinate system modifications or template menu control to be exercised transparently and without the intervention of a given application or host processor;

The inherent use of Stored Procedures and macro recording capability allows the recording and playback of event sequences which may activate both application menu commands or drawing sequences resulting in improved user productivity; and Host system and application throughput is significantly improved by eliminating the computer-intensive aspects of digitizer coordinate translation into template commands and the unnecessary processing of digitizer reports from within areas of the digitizer device for which the application has no specific meaning.

LISTING 1

Device [14]

| | |
|---|---|
| Type: | CalComp 23180 |
| Size: | 18.00 by 12.00 Inches |
| Extent: | 22860 by 15240 counts |
| Resolution: | 1270 by 1270 counts per Inches |
| Borders: | Left = 1.00, Top = 1.00, Right = 1.00, Bottom = 1.00 Inches |
| Style: | |
| Shape | Round Rect |
| Outline | Shaded |
| Fill | Gray! |
| Font | Large |
| Horizontal | Center |
| Vertical | Top |
| Label | Device |

Tablet [0]

| | |
|---|---|
| Group: | 0 |
| Extent: | 10000 by 10000 counts |
| Resolution: | 555 by 833 counts per Inches |
| Style: | |
| Shape | Rectangle |
| Outline | Shaded |
| Fill | White! |
| Font | Large |
| Horizontal | Center |
| Vertical | Center |
| Label | Tablet |

Region [0]

| | |
|---|---|
| Group: | 0 |
| Device Bounds: | Left = 0.52, Top = 11.49, Right = 8.00, Bottom = 7.00 Inches |
| Tablet Bounds: | Left = 292, Top = 9583, Right = 4449, Bottom = 5841 counts |

-continued

| LISTING 1 | |
|---|---|
| Extent: | 1000 by 1000 counts |
| Resolution: | 133 by 222 counts per Inches |
| Origin: | 500,500 in regional coordinates |
| Rotation: | 0 degrees |
| Event Mask: | Relative, B1 Down, B1 Up, B2 Down, B2 Up, B3 Down, B3 Up, B4 Down, B4 Up |
| Style: | |
| | |
| Shape | Rectangle |
| Outline | Shaded |
| Fill | White! |
| Font | Large |
| Horizontal | Center |
| Vertical | Center |
| Label | Display (0) |
| Template: | Pen or Pointer |
| Region [1] | |
| | |
| Group: | 1 |
| Device Bounds: | Left = 10.00, Top = 11.49, Right = 13.49, Bottom = 9.48 Inches |
| Tablet Bounds: | Left = 5560, Top = 9575, Right = 7499, Bottom = 7908 counts |
| Extent: | 1939 by 1667 counts |
| Resolution: | 555 by 829 counts per Inches |
| Origin: | 0, 0 in regional coordintes |
| Rotation: | 0 degrees |
| Event Mask: | B1 Up |
| Style: | |
| | |
| Shape | Rectangle |
| Outline | Shaded |
| Fill | White! |
| Font | Large |
| Horizontal | Center |
| Vertical | Center |
| Label | New (1) |
| Template: | Keystrokes = Alt-F N |
| Region [2] | |
| | |
| Group: | 1 |
| Device Bounds: | Left = 10.00, Top = 8.99, Right = 13.49, Bottom = 7.00 Inches |
| Tablet Bounds: | Left = 5559, Top = 7497, Right = 7499, Bottom = 5840 counts |
| Extent: | 1940 by 1657 counts |
| Resolution: | 555 by 832 counts per Inches |
| Origin: | 0, 0 in regional coordinates |
| Rotation: | 0 degrees |
| Event Mask: | B1 Up |
| Style: | |
| | |
| Shape: | Rectangle |
| Outline | Shaded |
| Fill | White! |
| Font | Large |
| Horizontal | Center |
| Vertical | Center |
| Label | Save (2) |
| Template: | Keystrokes = Alt-F S |
| Region [3] | |
| | |
| Group: | 1 |
| Device Bounds: | Left = 13.99, Top = 11.49, Right = 17.48, Bottom = 9.49 Inches |
| Tablet Bounds: | Left = 7776, Top = 9575, Right = 9712, Bottom = 7915 counts |
| Extent: | 1936 by 1660 counts |
| Resolution: | 554 by 830 counts per Inches |
| Origin: | 0, 0 in regional coordinates |
| Rotation: | 0 degrees |
| Event Mask: | B1 Up |
| Style: | |
| | |
| Shape | Rectangle |
| Outline | Shaded |
| Fill | White! |
| Font | Large |
| Horizontal | Center |
| Vertical | Center |
| Label | Open (3) |
| Template: | Keystrokes = Alt-F O |
| Region [4] | |

| LISTING 1 | |
|---|---|
| Group: | 1 |
| Device Bounds: | Left = 13.99, Top = 8.98, Right = 17.48, Bottom = 6.99 Inches |
| Tablet Bounds: | Left = 7776, Top = 7489, Right = 9712, Bottom = 5825 counts |
| Extent: | 1936 by 1664 counts |
| Resolution: | 554 by 836 counts per Inches |
| Origin: | 0, 0 in regional coordinates |
| Rotation: | 0 degrees |
| Event Mask: | B1 Up |
| Style: | |
| | |
| Shape | Rectangle |
| Outline | Shaded |
| Fill | White! |
| Font | Large |
| Horizontal | Center |
| Vertical | Center |
| Label | Close (4) |
| Template: | Keystrokes = Alt-F C |
| Region [5] | |
| | |
| Group: | 2 |
| Device Bounds: | Left = 4.52, Top = 2.51, Right = 8.00, Bottom = 0.52 Inches |
| Tablet Bounds: | Left = 2515, Top = 2097, Right = 4449, Bottom = 434 counts |
| Extent: | 1934 by 1663 counts |
| Resolution: | 555 by 835 counts per Inches |
| Origin: | 0, 0 in regional coordinates |
| Rotation: | 0 degrees |
| Event Mask: | B1 Up |
| Style: | |
| | |
| Shape | Rectangle |
| Outline | Shaded |
| Fill | White! |
| Font | Large |
| Horizontal | Center |
| Vertical | Center |
| Label | 270 Degrees (5) |
| Procedure: | Address   Argument 1   Argument 2   Argument 3   Argument 4 |
| Set Region Rotation | Region 0   270 Degrees |
| Region [6] | |
| | |
| Group: | 2 |
| Device Bounds: | Left = 4.52, Top = 5.00, Right = 7.99, Bottom = 3.00 Inches |
| Tablet Bounds: | Left = 2515, Top = 4173, Right = 4444, Bottom = 2508 counts |
| Extent: | 1929 by 1665 counts |
| Resolution: | 555 by 832 counts per Inches |
| Origin: | 0, 0 in regional coordinates |
| Rotation: | 0 degrees |
| Event Mask: | B1 Up |
| Style: | |
| | |
| Shape | Rectangle |
| Outline | Shaded |
| Fill | White! |
| Font | Large |
| Horizontal | Center |
| Vertical | Center |
| Label | 90 Degrees (6) |
| Procedure: | Address   Argument 1   Argument 2   Argument 3   Argument 4 |
| Set Region Rotation | Region 0   90 Degrees |
| Region [7] | |
| | |
| Group: | 2 |
| Device Bounds: | Left = 0.52, Top = 2.50, Right = 4.00, Bottom = 0.51 Inches |
| Tablet Bounds: | Left = 292, Top = 2089, Right = 2226, Bottom = 426 counts |
| Extent: | 1934 by 1663 counts |
| Resolution: | 555 by 835 counts per Inches |
| Origin: | 0, 0 in regional coordinates |
| Rotation: | 0 degrees |
| Event Mask: | B1 Up |
| Style: | |
| | |
| Shape | Rectangle |
| Outline | Shaded |
| Fill | White! |
| Font | Large |
| Horizontal | Center |

-continued

| LISTING 1 | |
|---|---|
| Vertical | Center |
| Label | 180 Degrees (7) |
| Procedure: | Address    Argument 1    Argument 2    Argument 3    Argument 4 |
| Set Region Rotation | Region 0    180 Degrees |
| Region [8] | |
| | |
| Group: | 2 |
| Device Bounds: | Left = 0.52, Top = 4.99, Right = 4.00, Bottom = 3.00 Inches |
| Tablet Bounds: | Left = 292, Top = 4165, Right = 2226, Bottom = 2500 counts |
| Extent: | 1934 by 1665 counts |
| Resolution: | 555 by 836 counts per Inches |
| Origin: | 0, 0 in regional coordinates |
| Rotation: | 0 degrees |
| Event Mask: | B1 Up |
| Style: | |
| | |
| Shape | Rectangle |
| Outline | Shaded |
| Fill | White[1] |
| Font | Large |
| Horizontal | Center |
| Vertical | Center |
| Label | 0 Degrees (8) |
| Procedure: | Address    Argument 1    Argument 2    Argument 3    Argument 4 |
| Set Region Rotation | Region 0    0 Degrees |
| Region [9] | |
| | |
| Group: | 3 |
| Device Bounds: | Left = 10.00, Top = 5.00, Right = 13.49, Bottom = 3.01 Inches |
| Tablet Bounds: | Left = 5560, Top = 4173, Right = 7499, Bottom = 2516 counts |
| Extent: | 1939 by 1657 counts |
| Resolution: | 555 by 832 counts per Inches |
| Origin: | 0, 0 in reginoal coordinates |
| Rotation: | 0 degrees |
| Event Mask: | B1 Up |
| Style: | |
| | |
| Shape | Rectangle |
| Outline | Shaded |
| Fill | White! |
| Font | Large |
| Horizontal | Center |
| Vertical | Center |
| Label | Open (9) |
| Procedure: | Address    Argument 1    Argument 2    Argument 3    Argument 4 |
| Disable Region | Group 3 |
| Enable Region | Region 11 |
| Open Macro | Region 0 |
| Region [10] | |
| | |
| Group: | 3 |
| Device Bounds: | Left = 10.00, Top = 2.50, Right = 13.49, Bottom = 0.51 Inches |
| Tablet Bounds: | Left = 5559, Top = 2088, Right = 7499, Bottom = 425 counts |
| Extent: | 1940 by 1663 counts |
| Resolution: | 555 by 835 counts per Inches |
| Origin: | 0, 0 in regional coordinates |
| Rotation: | 0 degrees |
| Event Mask: | B1 Up |
| Style: | |
| | |
| Shape | Rectangle |
| Outline | Shaded |
| Fill | White! |
| Font | Large |
| Horizontal | Center |
| Vertical | Center |
| Label | Play (10) |
| Procedure: | Address    Argument 1    Argument 2    Argument 3    Argument 4 |
| Play Macro | Region 0 |
| Region [11] | |
| | |
| Group: | 3 |
| Device Bounds: | Left = 13.99, Top = 5.00, Right = 17.48, Bottom = 3.01 Inches |
| Tablet Bounds: | Left = 7776, Top = 4173, Right = 9712, Bottom = 2516 counts |
| Extent: | 1936 by 1657 counts |
| Resolution: | 554 by 832 counts per Inches |
| Origin: | 0, 0 in reginal coordinates |

-continued

LISTING 1

| | |
|---|---|
| Rotation: | 0 degrees |
| Event Mask: | B1 Up |
| Style: | |
| | |
| Shape | Rectangle |
| Outline | Shaded |
| Fill | White! |
| Font | Large |
| Horizontal | Center |
| Vertical | Center |
| Label | End (11) |
| Procedure: | Address   Argument 1   Argument 2   Argument 3   Argument 4 |
| Disable Region | Group 3 |
| Enable Region | Region 10 |
| Enable Region | Region 12 |
| End Macro | Region 0 |
| Region [12] | |
| | |
| Group: | 3 |
| Device Bounds: | Left = 13.99, Top = 2.51, Right = 17.48, Bottom = 0.51 Inches |
| Tablet Bounds: | Left = 7776, Top = 2097, Right = 9712, Bottom = 432 counts |
| Extent: | 1936 by 1665 counts |
| Resolution: | 554 by 832 counts per Inches |
| Origin: | 0, 0 in regional coordinates |
| Rotation: | 0 degrees |
| Event Mask: | B1 Up |
| Style: | |
| | |
| Shape | Rectangle |
| Outline | Shaded |
| Fill | White! |
| Font | Large |
| Horizontal | Center |
| Vertical | Center |
| Label | Close (12) |
| Procedure: | Address   Argument 1   Argument 2   Argument 3   Argument 4 |
| Disable Region | Group 3 |
| Enable Region | Region 9 |
| Close Macro | Region 0 |

Listing 2

| | | | | | | |
|---|---|---|---|---|---|---|
| | | | | | | [Prolog] |
| 0000: | 8480 | 0000 | | | | Close Tablet |
| 0004: | 8080 | 0000 | | | | Flush Device |
| 0008: | 8400 | 0000 | | | | Open Tablet |
| 000C: | 8600 | 0000 | 2710 | 2710 | | Set Tablet Extents |
| | | | | | | [Region 0] |
| 0014: | 8B00 | 0000 | 0124 | 16D1 | 1161 | 256F | Open Region |
| 0020: | 8E00 | 0000 | 0000 | | | | Set Region Group |
| 0026: | 8F00 | 0000 | 03FF | | | | Set Region Mask |
| 002C: | 9000 | 0000 | 03E8 | 03E8 | | | Set Region Extents |
| 0034: | 9200 | 0000 | 01F4 | 01F4 | | | Set Region Origin |
| 003C: | 9300 | 0000 | 0000 | | | | Set Region Rotation |
| 0042: | 8D00 | 0000 | | | | | Enable Region |
| | | | | | | [Region 1] |
| 0046: | 8B00 | 0001 | 15B8 | 1EE4 | 1D4B | 2567 | Open Region |
| 0052: | 8E00 | 0001 | 0001 | | | | Set Region Group |
| 0058: | 8F00 | 0001 | 0002 | | | | Set Region Mask |
| 005E: | 9200 | 0001 | 0000 | 0000 | | | Set Region Origin |
| 0066: | 9300 | 0001 | 0000 | | | | Set Region Rotation |
| 006C: | 8D00 | 0001 | | | | | Enable Region |
| | | | | | | [Region 2] |
| 0070: | 8B00 | 0002 | 15B7 | 16D0 | 1D4B | 1D49 | Open Region |
| 007C: | 8E00 | 0002 | 0001 | | | | Set Region Group |
| 0082: | 8F00 | 0002 | 0002 | | | | Set Region Mask |
| 0088: | 9200 | 0002 | 0000 | 0000 | | | Set Region Origin |

-continued

Listing 2

| | | | | | | |
|---|---|---|---|---|---|---|
| 0090: | 9300 | 0002 | 0000 | | | Set Region Rotation |
| 0096: | 8D00 | 0002 | | | | Enable Region |
| | | | | | | [Region 3] |
| 009A: | 8B00 | 0003 | 1E60 | 1EEB | 25F0 | 2567 | Open Region |
| 00A6: | 8E00 | 0003 | 0001 | | | Set Region Group |
| 00AC: | 8F00 | 0003 | 0002 | | | Set Region Mask |
| 00B2: | 9200 | 0003 | 0000 | 0000 | | Set Region Origin |
| 00BA: | 9300 | 0003 | 0000 | | | Set Region Rotation |
| 00C0: | 8D00 | 0003 | | | | Enable Region |
| | | | | | | [Region 4] |
| 00C4: | 8B00 | 0004 | 1E60 | 16C1 | 25F0 | 1D41 | Open Region |
| 00D0: | 8E00 | 0004 | 0001 | | | Set Region Group |
| 00D6: | 8F00 | 0004 | 0002 | | | Set Region Mask |
| 00DC: | 9200 | 0004 | 0000 | 0000 | | Set Region Origin |
| 00E4: | 9300 | 0004 | 0000 | | | Set Region Rotation |
| 00EA: | 8D00 | 0004 | | | | Enable Region |
| | | | | | | [Region 5] |
| 00EE: | 8B00 | 0005 | 09D3 | 01B2 | 1161 | 0831 | Open Region |
| 00FA: | 8E00 | 0005 | 0002 | | | Set Region Group |
| 0100: | 8F00 | 0005 | 0002 | | | Set Region Mask |
| 0106: | 9200 | 0005 | 0000 | 0000 | | Set Region Origin |
| 010E: | 9300 | 0005 | 0000 | | | Set Region Rotation |
| 0114: | 8D00 | 0005 | | | | Enable Region |
| | | | | | | [Procedure 5] |
| 0118: | 9400 | 0005 | | | | Open Procedure |
| 011C: | 9300 | 0000 | 010E | | | Set Region Rotation |
| 0122: | 9480 | 0005 | | | | End Procedure |
| | | | | | | [Region 6] |
| 0126: | 8B00 | 0006 | 09D3 | 09CC | 115C | 104D | Open Region |
| 0132: | 8E00 | 0006 | 0002 | | | Set Region Group |
| 0138: | 8F00 | 0006 | 0002 | | | Set Region Mask |
| 013E: | 9200 | 0006 | 0000 | 0000 | | Set Region Origin |
| 0146: | 9300 | 0006 | 0000 | | | Set Region Rotation |
| 014C: | 8D00 | 0006 | | | | Enable Region |
| | | | | | | [Procedure 6] |
| 0150: | 9400 | 0006 | | | | Open Procedure |
| 0154: | 9300 | 0000 | 005A | | | Set Region Rotation |
| 015A: | 9480 | 0006 | | | | End Procedure |
| | | | | | | [Region 7] |
| 015E: | 8B00 | 0007 | 0124 | 01AA | 08B2 | 0829 | Open Region |
| 016A: | 8E00 | 0007 | 0002 | | | Set Region Group |
| 0170: | 8F00 | 0007 | 0002 | | | Set Region Mask |
| 0176: | 9200 | 0007 | 0000 | 0000 | | Set Region Origin |
| 017E: | 9300 | 0007 | 0000 | | | Set Region Rotation |
| 0184: | 8D00 | 0007 | | | | Enable Region |
| | | | | | | [Procedure 7] |
| 0188: | 9400 | 0007 | | | | Open Procedure |
| 018C: | 9300 | 0000 | 00B4 | | | Set Region Rotation |
| 0192: | 9480 | 0007 | | | | End Procedure |
| | | | | | | [Region 8] |
| 0196: | 8B00 | 0008 | 0124 | 09C4 | 08B2 | 1045 | Open Region |
| 01A2: | 8E00 | 0008 | 0002 | | | Set Region Group |
| 01A8: | 8F00 | 0008 | 0002 | | | Set Region Mask |
| 01AE: | 9200 | 0008 | 0000 | 0000 | | Set Region Origin |
| 01B6: | 9300 | 0008 | 0000 | | | Set Region Rotation |
| 01BC: | 8D00 | 0008 | | | | Enable Region |
| | | | | | | [Procedure 8] |
| 01C0: | 9400 | 0008 | | | | Open Procedure |
| 01C4: | 9300 | 0000 | 0000 | | | Set Region Rotation |
| 01CA: | 9480 | 0008 | | | | End Procedure |
| | | | | | | [Region 9] |
| 01CE: | 8B00 | 0009 | 15B8 | 09D4 | 1D4B | 104D | Open Region |
| 01DA: | 8E00 | 0009 | 0003 | | | Set Region Group |
| 01E0: | 8F00 | 0009 | 0002 | | | Set Region Mask |
| 01E6: | 9200 | 0009 | 0000 | 0000 | | Set Region Origin |
| 01EE: | 9300 | 0009 | 0000 | | | Set Region Rotation |

-continued

Listing 2

| | | | | | | | |
|---|---|---|---|---|---|---|---|
| 01F4: | 8D00 | 0009 | | | | | Enable Region |
| | | | | | | | [Procedure 9] |
| 01F8: | 9400 | 0009 | | | | | Open Procedure |
| 01FC: | 8D80 | 0203 | | | | | Disable Region |
| 0200: | 8D00 | 000B | | | | | Enable Region |
| 0204: | 8900 | 0000 | | | | | Open Macro |
| 0208: | 9480 | 0009 | | | | | End Procedure |
| | | | | | | | [Region 10] |
| 020C: | 8B00 | 000A | 15B7 | 01A9 | 1D4B | 0828 | Open Region |
| 0218: | 8E00 | 000A | 0003 | | | | Set Region Group |
| 021E: | 8F00 | 000A | 0002 | | | | Set Region Mask |
| 0224: | 9200 | 000A | 0000 | 0000 | | | Set Region Origin |
| 022C: | 9300 | 000A | 0000 | | | | Set Region Rotation |
| 0232: | 8D00 | 000A | | | | | Enable Region |
| | | | | | | | [Procedure 10] |
| 0236: | 9400 | 000A | | | | | Open Procedure |
| 023A: | 8A00 | 0000 | | | | | Play Macro |
| 023E: | 9480 | 000A | | | | | End Procedure |
| | | | | | | | [Region 11] |
| 0242: | 8B00 | 000B | 1E60 | 09D4 | 25F0 | 104D | Open Region |
| 024E: | 8E00 | 000B | 0003 | | | | Set Region Group |
| 0254: | 8F00 | 000B | 0002 | | | | Set Region Mask |
| 025A: | 9200 | 000B | 0000 | 0000 | | | Set Region Origin |
| 0262: | 9300 | 000B | 0000 | | | | Set Region Rotation |
| 0268: | 8D00 | 000B | | | | | Enable Region |
| | | | | | | | [Procedure 11] |
| 026C: | 9400 | 000B | | | | | Open Procedure |
| 0270: | 8D80 | 0203 | | | | | Disable Region |
| 0274: | 8D00 | 000A | | | | | Enable Region |
| 0278: | 8D00 | 000C | | | | | Enable Region |
| 027C: | 8980 | 0000 | | | | | End Macro |
| 0280: | 9480 | 000B | | | | | End Procedure |
| | | | | | | | [Region 12] |
| 0284: | 8B00 | 000C | 1E60 | 01B0 | 25F0 | 0831 | Open Region |
| 0290: | 8E00 | 000C | 0003 | | | | Set Region Group |
| 0296: | 8F00 | 000C | 0002 | | | | Set Region Mask |
| 029C: | 9200 | 000C | 0000 | 0000 | | | Set Region Origin |
| 02A4: | 9300 | 000C | 0000 | | | | Set Region Rotation |
| 02AA: | 8D00 | 000C | | | | | Enable Region |
| | | | | | | | [Procedure 12] |
| 02AE: | 9400 | 000C | | | | | Open Procedure |
| 02B2: | 8D80 | 0203 | | | | | Disable Region |
| 02B6: | 8D00 | 0009 | | | | | Enable Region |
| 02BA: | 8A80 | 0000 | | | | | Close Macro |
| 02BE: | 9480 | 000C | | | | | End Procedure |
| | | | | | | | [Epilog] |
| 02C2: | 8500 | 0000 | | | | | Enable Tablet |

I claim:

1. A method implemented by a microprocessor for transferring information from a digitizer to a connected computer, the digitizer having a surface adapted to work with a pointer via sensors which sense the position of the pointer on the surface in a coordinate system of the digitizer and report such position to the microprocessor, which coordinate system of the digitizer has a point of origin with respect to the digitizer, the microprocessor being located in the digitizer or another digitizer or a digitizer interface located outside of the computer, comprising:

(a) receiving a definition of boundaries of a region within the range of movement of the pointer and smaller than the range of movement of the pointer having a second coordinate system for output from the digitizer, which second coordinate system allows specification of points sensed in the digitizer's coordinate system but is not congruent with the digitizer's coordinate system because the location of the point of origin is different from the digitizer's coordinate system;

(b) receiving from the sensors, in the coordinate system of the digitizer, a plurality of coordinates for a plurality of specified points; and (c) translating the coordinates of the digitizer's coordinate system into coordinates of the second coordinate system for the points; and (d) providing the coordinates of the second coordinate system for the points to the computer.

2. A digitizer including a digital memory containing a computer program for execution on a microprocessor within the digitizer which program causes the microprocessor to perform the method of claim 1.

3. A method, implemented by a microprocessor, for transferring information from a digitizer to a computer connected to the digitizer, the digitizer having a surface adapted to work with a pointer via sensors which report the position of the pointer on the surface to the microprocessor in a coordinate system of the digitizer, which coordinate system has a point of origin with respect to the digitizer, the microprocessor being located in the digitizer or another digitizer or a digitizer interface located outside of the computer, comprising:

(a) receiving a first and a second definition of boundaries of a first and a second region within the range of movement of the pointer;

(b) receiving a definition of a first and a second regional coordinate system for each of the first and the second regions, which first and second regional coordinate systems each allow specification of points specified in the digitizer's coordinate system but are not congruent with the digitizer's coordinate system because the location of the point of origin is different from the digitizer's coordinate system;

(c) receiving coordinates of a point reported by the sensors to the microprocessor specifying, in the digitizer's coordinate system, the location of the pointer;

(d) if the location of the pointer is within the boundaries of the first region, translating the coordinates of the point in the digitizer's coordinate system into coordinates of the first regional coordinate system for that point; and (e) if the location of the pointer is within the boundaries of the second region, translating the coordinates of the point in the digitizer's coordinate system into coordinates of the second regional coordinate system for that point; and (f) providing the set of coordinates of the regional coordinate system to the computer.

4. A digitizer including a digital memory containing a computer program which program causes a microprocessor within the digitizer to perform the method of claim 3.

5. The digitizer of claim 4 wherein the program further causes the computer to:

(a) add to the translated coordinates from each of the first and the second regions a datum identifying the region in which the pointer is located; and (b) provide the datum to the computer along with the translated coordinates.

6. The method of claim 3 further comprising:

(a) adding to the translated coordinates from each of the first and the second regions a datum identifying the region in which the pointer is located; and (b) providing the datum to the computer along with the translated coordinates.

7. A method, implemented by a microprocessor, for executing a control command received by a digitizer from a computer and directed to any one of a plurality of regions, the microprocessor being located in the digitizer or another digitizer or a digitizer interface located outside of the computer, comprising:

(a) receiving from the computer one or more commands to partition the active area of the digitizer into a plurality of regions, each of which has a coordinate system which coordinate system has a point of origin wherein the coordinate system of a first region is not congruent with the coordinate system of another region because the location of the point of origin is different from the other coordinate system;

(b) storing the partition information in a memory within the digitizer;

(c) receiving from the computer a command directed to one of the regions; and (d) executing the command with respect to the appropriate region.

8. A digitizer including a digital memory containing a computer program which program causes a microprocessor within the digitizer to perform the method of claim 7.

9. A method, implemented by a system with a computer connected to a digitizer having a microprocessor in said digitizer or another digitizer or a digitizer interface located outside of the computer, comprising:

(a) receiving at said microprocessor revisable definitions of boundaries of each of a plurality of regions within the range of movement of a pointer and storing said revisable definitions in a temporary memory within the digitizer;

(b) receiving at said microprocessor a procedure associated with a region and storing the procedure in a memory within the digitizer, which procedure is a set of actions to be executed by the microprocessor which actions include outputting information from said microprocessor to said computer;

(c) receiving at said microprocessor input from a user in the form of locating the pointer within said region associated with said procedure and taking a further predefined action; and (d) in response to receipt of said input from said region, executing within said microprocessor said actions.

10. A system including a computer connected to a digitizer which responds to a pointer, comprising:

(a) means for connecting the digitizer to the computer;

(b) means for defining boundaries of each of a plurality of regions within the range of movement of the pointer;

(c) means for storing the definitions of the boundaries in a memory within the digitizer;

(d) means for changing the definition of the boundaries of a region without redefining the boundaries of another of the regions;

(e) means for determining, for each of the regions, whether the pointer is located in the region;

(f) means for defining a procedure associated with a region and storing the procedure in a memory within the digitizer, which procedure is a set of actions to be executed by the digitizer when the procedure is invoked, which actions include outputting information from the digitizer to the computer;

(g) means for allowing a user to invoke the procedure by locating the pointer within the associated region and taking a further predefined action; and (h) means within the digitizer for executing the actions when the procedure is invoked by a user.

11. A method for a digitizer connected to a computer implemented by a microprocessor located in the digitizer or another digitizer or a digitizer interface located outside of the computer, comprising:

(a) receiving at the microprocessor definitions of boundaries of each of a plurality of regions within the range of movement of a pointer and storing the definitions of the boundaries in a memory within the digitizer;

(b) receiving at the microprocessor a definition of an event mask associated with a region and storing the definition of the event mask in a memory within the digitizer;

(c) receiving at the microprocessor data from a user input to the digitizer;

(d) determining in the microprocessor whether the pointer is located in the region associated with the event mask;

(e) comparing in the microprocessor the data generated from user input while the pointer is within the region to the event mask; and (f) transmitting the data from the microprocessor to the computer if and only if the data satisfies the event mask.

12. A system including a computer connected to a digitizer which responds to a pointer, comprising:

(a) means for defining the boundaries of each of a plurality of regions within the range of movement of the pointer;

(b) means for storing the definitions of the boundaries in a memory within the digitizer;

(c) means for changing the definition of the boundaries of a region without redefining the boundaries of another of the regions;

(d) means for generating data from user input to the digitizer;

(e) a microprocessor within the digitizer for determining, for each of the regions, whether the pointer is located in the region and, as a function of whether the pointer is located in the region, outputting said data from the microprocessor to the computer;

(f) means for defining an event mask associated with a region and storing the event mask in a memory within the digitizer;

(g) means within the microprocessor for comparing the data generated from user input while the pointer is within the region to the event mask; and (h) means for transmitting the data from the microprocessor to the computer if and only if it satisfies the event mask.

13. A method for a system including a computer connected to a digitizer adapted to work with a pointer, the method implemented by a microproessor located in the digitizer or another digitizer or a digitizer interface located outside of the computer, comprising:

(a) receiving at the microprocessor a definition of a macro as a data set to be output by the digitizer when the macro is invoked and storing the definition in a memory within the digitizer;

(b) receiving at the microprocessor a definition of user input via said pointer to be interpreted as an invocation of said macro and storing the definition in a memory within the digitizer;

(c) receiving at the microprocessor user input via said pointer invoking the macro; and (d) outputting from the digitizer to the computer said data set.

14. The method of claim 13, wherein:

(a) said definition of said macro is generated by a user of the digitizer, via said pointer.

15. A system including a computer connected to a digitizer, comprising:

(a) means for defining a macro as a data set to be output by the digitizer to the computer when the macro is invoked and storing the data set in a memory within the digitizer;

(b) means within the digitizer for allowing a user to invoke the macro; and (c) a microprocessor within the digitizer for transmitting the data set to the computer when the macro is invoked.

16. The digitizer of claim 15, further comprising:

(a) means for allowing a user of the digitizer to define the macro by use of the digitizer.

17. A method implemented by a first computer program running on a computer for transferring information from a first and a second pointing device connected to the computer to a second program running on the computer, the pointing devices each adapted to work with a pointer and outputting events, comprising:

(a) receiving an instruction to enable a first active area on the first pointing device within a first range of coordinate numbers;

(b) receiving an instruction to enable a second active area on the second pointing device within a second range of coordinate numbers which overlaps the first range of coordinate numbers;

(c) receiving a first series of events reported by the first pointing device to the computer, each event including specified coordinates within the first range of coordinates, and adding to each event information specifying the first active area;

(d) receiving a second series of events reported by the second pointing device to the computer, each event including specified coordinates within the second range of coordinates, and adding to each event information specifying the second active area;

(e) providing the first and the second series of events to the second program.

18. A computer readable medium containing a computer program which program causes a computer to perform the method of claim 17.

19. A method implemented by a first computer program running on a computer for transferring a control command from a second program running on the computer to any one of a plurality of digitizers connected to the computer, comprising:

(a) receiving a command, including digitizer identification information, directed by the second program running on the computer to a digitizer having a logic circuit which interprets and acts on received commands;

(b) modifying the command by removing the digitizer identification information; and (c) providing the modified command to the digitizer.

20. A computer readable medium containing a computer program which program causes a computer to perform the method of claim 19.

21. A method implemented by a first computer program running on a computer for transferring information from a digitizer connected to the computer to a second program running on the computer, the digitizer having a surface adapted to work with a pointer and outputting the position of the pointer on the surface in a coordinate system of the digitizer which coordinate system has a point of origin, comprising:

(a) receiving a definition of boundaries of a region within the range of movement of the pointer and smaller than the range of movement of the pointer;

(b) establishing a unique datum identifying the region, (c) receiving a definition of a regional coordinate system for the region, which regional coordinate system allows specification of points within the region specified in the digitizer's coordinate system but is not congruent with the digitizer's coordinate system because the location of the point of origin is different from the digitizer's coordinate system;

(d) receiving a specification of a point within the region reported by the digitizer to the computer specifying, in the digitizer's coordinate system, the location of the pointer;

(e) translating the coordinates of the digitizer's coordinate system into coordinates of the regional coordinate system for the point; and (f) providing the coordinates of the regional coordinate system for the point to the second program.

22. A computer readable medium containing a computer program which program causes a computer to perform the method of claim 21.

23. The method of claim 21 further comprising:

(a) adding to the translated coordinates from the region the datum identifying the region in which the pointer is located; and (b) providing the datum to the second program along with the translated coordinates.

24. A computer readable medium containing a computer program which program causes a computer to perform the method of claim 23.

25. The method of claim 21 wherein the location point of origin of the regional coordinate system may defined as a location other than a corner of the region.

26. A computer readable medium containing a computer program which program causes a computer to perform the method of claim 25.

27. The method of claim 21 wherein the definition of a regional coordinate system is received from the second program and the second program is an application program.

28. A computer readable medium containing a computer program which program causes a computer to perform the method of claim 27.

29. A method implemented by a first computer program running on a computer for transferring information from a digitizer connected to the computer to a second program running on the computer, the digitizer having a surface adapted to work with a pointer and outputting the position of the pointer on the surface in a coordinate system of the digitizer which coordinate system has a scale, comprising:

(a) receiving a definition of boundaries of a region within the range of movement of the pointer and smaller than the range of movement of the pointer;

(b) establishing a unique datum identifying the region, (c) receiving a definition of a regional coordinate system for the region, which regional coordinate system allows specification of points within the region specified in the digitizer's coordinate system but is not congruent with the digitizer's coordinate system because the scale is different from the digitizer's coordinate system;

(d) receiving a specification of a point within the region reported by the digitizer to the computer specifying, in the digitizer's coordinate system, the location of the pointer;

(e) translating the coordinates of the digitizer's coordinate system into coordinates of the regional coordinate system for the point; and (f) providing the coordinates of the regional coordinate system for the point to the second program.

30. A computer readable medium containing a computer program which program causes a computer to perform the method of claim 29.

31. The method of claim 29 further comprising:

(a) adding to the translated coordinates from the region the datum identifying the region in which the pointer is located; and (b) providing the datum to the second program along with the translated coordinates.

32. A computer readable medium containing a computer program which program causes a computer to perform the method of claim 31.

33. The method of claim 29 wherein the definition of a regional coordinate system is received from the second program and the second program is an application program.

34. A computer readable medium containing a computer program which program causes a computer to perform the method of claim 33.

35. A method implemented by a first computer program running on a computer for transferring information from a digitizer connected to the computer to a second program running on the computer, the digitizer having a surface adapted to work with a pointer and outputting the position of the pointer on the surface in a coordinate system of the digitizer which coordinate system has an angle of rotation which angle might be zero relative to the digitizer, comprising:

(a) receiving a definition of boundaries of a region within the range of movement of the pointer and smaller than the range of movement of the pointer;

(b) establishing a unique datum identifying the region, (c) receiving a definition of a regional coordinate system for the region, which regional coordinate system allows specification of points within the region specified in the digitizer's coordinate system but is not congruent with the digitizer's coordinate system because angle of rotation is different from the digitizer's coordinate system;

(d) receiving a specification of a point within the region reported by the digitizer to the computer specifying, in the digitizer's coordinate system, the location of the pointer;

(e) translating the coordinates of the digitizer's coordinate system into coordinates of the regional coordinate system for the point; and (f) providing the coordinates of the regional coordinate system for the point to the second program.

36. A computer readable medium containing a computer program which program causes a computer to perform the method of claim 35.

37. The method of claim 35 further comprising:

(a) adding to the translated coordinates from the region the datum identifying the region in which the pointer is located; and (b) providing the datum to the second program along with the translated coordinates.

38. A computer readable medium containing a computer program which program causes a computer to perform the method of claim 37.

39. The method of claim 35 wherein the definition of a regional coordinate system is received from the second program and the second program is an application program.

40. A computer readable medium containing a computer program which program causes a computer to perform the method of claim 39.

41. A method implemented by a first computer program running on a computer for transferring information from a digitizer connected to the computer to a second program running on the computer, the digitizer having a surface adapted to work with a pointer and outputting the position of the pointer on the surface in a coordinate system of the digitizer which coordinate system has a point of origin, comprising:
   (a) receiving a first and a second definition of boundaries of a first and a second region within the range of movement of the pointer;
   (b) establishing for each region a unique datum identifying the region;
   (c) receiving a definition of a first and a second regional coordinate system for the first and the second regions respectively, which first and second regional coordinate systems each allow specification of points specified in the digitizer's coordinate system but are not congruent with the digitizer's coordinate system because the location of the point of origin is different from the digitizer's coordinate system;
   (d) receiving coordinates of a point reported by the digitizer to the computer specifying, in the digitizer's coordinate system, the location of the pointer;
   (e) if the location of the pointer is within the boundaries of the first region, translating the coordinates of the point in the digitizer's coordinate system into coordinates of the first regional coordinate system for that point and providing the set of coordinates of the regional coordinate system to the second program; and
   (f) if the location of the pointer is within the boundaries of the second region, translating the coordinates of the point in the digitizer's coordinate system into coordinates of the second regional coordinate system for that point and providing the set of coordinates of the regional coordinate system to the second program.

42. A computer readable medium containing a computer program which program causes a computer to perform the method of claims 41.

43. The method of claim 41 further comprising:
   (a) adding to the translated coordinates the datum identifying the region in which the pointer is located; and
   (b) providing the datum to the second program along with the translated coordinates.

44. A computer readable medium containing a computer program which program causes a computer to perform the method of claim 43.

45. The method of claim 41 wherein the location point of origin of each regional coordinate system may defined as a location other than a corner of the region.

46. A computer readable medium containing a computer program which program causes a computer to perform the method of claim 45.

47. The method of claim 41 wherein the definition of each regional coordinate system is received from the second program and the second program is an application program.

48. A computer readable medium containing a computer program which program causes a computer to perform the method of claim 47.

49. A method implemented by a first computer program running on a computer for transferring information from a digitizer connected to the computer to a second program running on the computer, the digitizer having a surface adapted to work with a pointer and outputting the position of the pointer on the surface in a coordinate system of the digitizer which coordinate system has a scale, comprising:
   (a) receiving a first and a second definition of boundaries of a first and a second region within the range of movement of the pointer;
   (b) establishing for each region a unique datum identifying the region;
   (c) receiving a definition of a first and a second regional coordinate system for each of the first and the second regions, which first and second regional coordinate systems each allow specification of points specified in the digitizer's coordinate system but are not congruent with the digitizer's coordinate system because the scale is different from the digitizer's coordinate system;
   (d) receiving coordinates of a point reported by the digitizer to the computer specifying, in the digitizer's coordinate system, the location of the pointer;
   (e) if the location of the pointer is within the boundaries of the first region, translating the coordinates of the point in the digitizer's coordinate system into coordinates of the first regional coordinate system for that point;
   (f) if the location of the pointer is within the boundaries of the second region, translating the coordinates of the point in the digitizer's coordinate system into coordinates of the second regional coordinate system for that point; and
   (g) providing the set of coordinates of the regional coordinate system to the second program.

50. A computer readable medium containing a computer program which program causes a computer to perform the method of claim 49.

51. The method of claim 49 further comprising:
   (a) adding to the translated coordinates the datum identifying the region in which the pointer is located; and
   (b) providing the datum to the second program along with the translated coordinates.

52. A computer readable medium containing a computer program which program causes a computer to perform the method of claim 51.

53. The method of claim 49 wherein the definition of each regional coordinate system is received from the second program and the second program is an application program.

54. A computer readable medium containing a computer program which program causes a computer to perform the method of claim 53.

55. A method implemented by a first computer program running on a computer for transferring information from a digitizer connected to the computer to a second program running on the computer, the digitizer having a surface adapted to work with a pointer and outputting the position of the pointer on the surface in a coordinate system of the digitizer which coordinate system has an angle of rotation which angle might be zero relative to the digitizer comprising:
   (a) receiving a first and a second definition of boundaries of a first and a second region within the range of movement of the pointer;
   (b) establishing for each region a unique datum identifying the region;

(c) receiving a definition of a first and a second regional coordinate system for each of the first and the second regions, which first and second regional coordinate systems each allow specification of points specified in the digitizer's coordinate system but are not congruent with the digitizer's coordinate system because the angle of rotation is different from the digitizer's coordinate system;

(d) receiving coordinates of a point reported by the digitizer to the computer specifying, in the digitizer's coordinate system, the location of the pointer;

(e) if the location of the pointer is within the boundaries of the first region, translating the coordinates of the point in the digitizer's coordinate system into coordinates of the first regional coordinate system for that point; and (f) if the location of the pointer is within the boundaries of the second region, translating the coordinates of the point in the digitizer's coordinate system into coordinates of the second regional coordinate system for that point; and (g) providing the set of coordinates of the regional coordinate system to the second program.

56. A computer readable medium containing a computer program which program causes a computer to perform the method of claim 55.

57. The method of claim 55 further comprising:

(a) adding to the translated coordinates the datum identifying the region in which the pointer is located; and (b) providing the datum to the second program along with the translated coordinates.

58. A computer readable medium containing a computer program which program causes a computer to perform the method of claim 57.

59. The method of claim 55 wherein the definition of each regional coordinate system is received from the second program and the second program is an application program.

60. A computer readable medium containing a computer program which program causes a computer to perform the method of claim 59.

61. A method implemented by a first computer program running on a computer for executing a control command from a second program running on the computer directed to any one of a plurality of regions of a digitizer, comprising:

(a) receiving one or more commands to partition the active area of the digitizer into a plurality of regions, each of which has a coordinate system which coordinate system has a point of origin and has an angle of rotation with respect to the digitizer which angle might be zero and has a scale wherein the coordinate system of a first region is not congruent with the coordinate system of another region because one of the following elements is different from the other coordinate system: location of the point of origin or scale or angle of rotation;

(b) storing the partition information in a memory;

(c) receiving from the second program a command directed to one of the regions; and (d) executing the command with respect to the appropriate region.

62. A computer readable medium containing a computer program which program causes a computer to perform the method of claim 61.

63. A method implemented by a first computer program running on a computer for transferring information from any one of a plurality of digitizers with different event packet output formats to a second program running on the computer, in a consistent format, comprising:

(a) receiving an event packet reported by a digitizer to the computer in a format of the digitizer which format does not include an indication of whether coordinates in the event packet are relative coordinates;

(b) translating the event packet to a format that includes an indication of whether coordinates in the event packet are relative coordinates or absolute coordinates;

(c) providing the translated event packet to the second program.

64. A computer readable medium containing a computer program which program causes a computer to perform the method of claim 63.

* * * * *